(12) United States Patent
Lee et al.

(10) Patent No.: US 12,022,485 B2
(45) Date of Patent: Jun. 25, 2024

(54) METHOD AND APPARATUS FOR RECEIVING DOWNLINK CONTROL INFORMATION IN WIRELESS COMMUNICATION SYSTEM

(71) Applicant: LG ELECTRONICS INC., Seoul (KR)

(72) Inventors: Kilbom Lee, Seoul (KR); Kyuseok Kim, Seoul (KR); Kijun Kim, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 419 days.

(21) Appl. No.: 17/311,833

(22) PCT Filed: Dec. 13, 2019

(86) PCT No.: PCT/KR2019/017666
§ 371 (c)(1),
(2) Date: Jun. 8, 2021

(87) PCT Pub. No.: WO2020/122658
PCT Pub. Date: Jun. 18, 2020

(65) Prior Publication Data
US 2022/0022233 A1  Jan. 20, 2022

(30) Foreign Application Priority Data
Dec. 13, 2018 (KR) .......................... 10-2018-0160983

(51) Int. Cl.
*H04W 72/23* (2023.01)
*H04L 1/00* (2006.01)
(Continued)

(52) U.S. Cl.
CPC .......... *H04W 72/23* (2023.01); *H04L 1/0003* (2013.01); *H04W 56/001* (2013.01); *H04W 72/1263* (2013.01); *H04W 74/0833* (2013.01)

(58) Field of Classification Search
CPC ............... H04W 72/23; H04W 56/001; H04W 72/1263; H04W 74/0833
See application file for complete search history.

(56) References Cited

U.S. PATENT DOCUMENTS 11,337,265 B2 * 5/2022 Zhou .................. H04L 27/2692
2010/0115358 A1   5/2010 Kotecha et al.
(Continued)

OTHER PUBLICATIONS

PCT International Application No. PCT/KR2019/017666, International Search Report dated Mar. 31, 2020, 16 pages.
(Continued)

*Primary Examiner* — Won Tae C Kim
(74) *Attorney, Agent, or Firm* — LEE, HONG, DEGERMAN, KANG & WAIMEY

(57) ABSTRACT

The present disclosure discloses operating methods of a user equipment and a base station in a wireless communication system, and a device supporting same. According to an embodiment applicable to the present disclosure, the user equipment may establish connection with the base station, on the basis of a synchronization signal/physical broadcast channel (SS/PBCH) block received from the base station. Subsequently, the user equipment may be configured, by the base station, with a transmission mode in which data generated from the same information is transmitted from a plurality of transmission reception points (TRPs), and may determine a size of a transmission block related to data provided from the plurality of TRPs on the basis of the transmission mode to obtain related data information. Accordingly, the base station and the user equipment can (Continued)

configure/determine the size of the transmission block related to the data without ambiguity therebetween.

10 Claims, 23 Drawing Sheets

(51) Int. Cl.
*H04W 56/00* (2009.01)
*H04W 72/1263* (2023.01)
*H04W 74/0833* (2024.01)

(56) References Cited

U.S. PATENT DOCUMENTS

| | | | |
|---|---|---|---|
| 2014/0192734 A1* | 7/2014 | Ng | H04L 5/0035 370/329 |
| 2022/0124761 A1* | 4/2022 | Muruganathan | H04W 72/1273 |

OTHER PUBLICATIONS

Lenovo et al., "Discussion of multi-panel/multi-TRP transmission," R1-1812784, 3GPP TSG RAN WG1 Meeting #95, Nov. 2018, 7 pages.

NTT Docomo, Inc., "Enhancements on multi-TRP/panel transmission," R1-1813333, 3GPP TSG RAN WG1 Meeting #95, Nov. 2018, 22 pages.

ZTE, "Enhancements on multi-TRP/Panel transmission," R1-1812256, 3GPP TSG RAN WG1 Meeting #95, Nov. 2018, 16 pages.

LG Electronics, "Enhancements on multi-TRP/panel transmission," R1-1812581, 3GPP TSG RAN WG1 Meeting #95, Nov. 2018, 13 pages.

* cited by examiner

FIG. 11
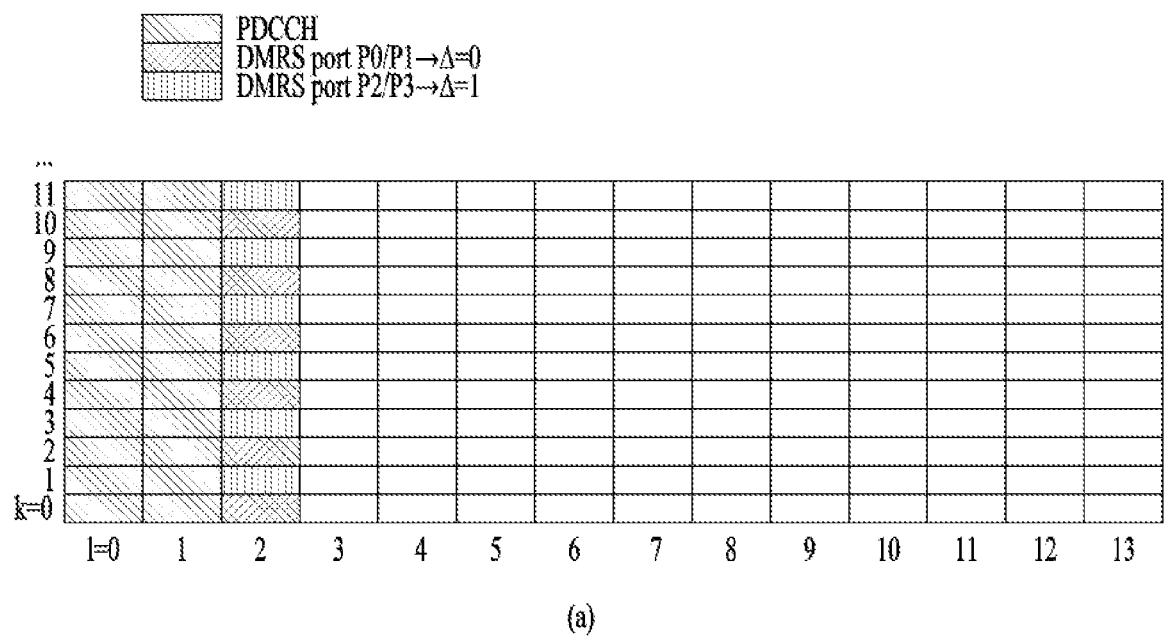
(a)
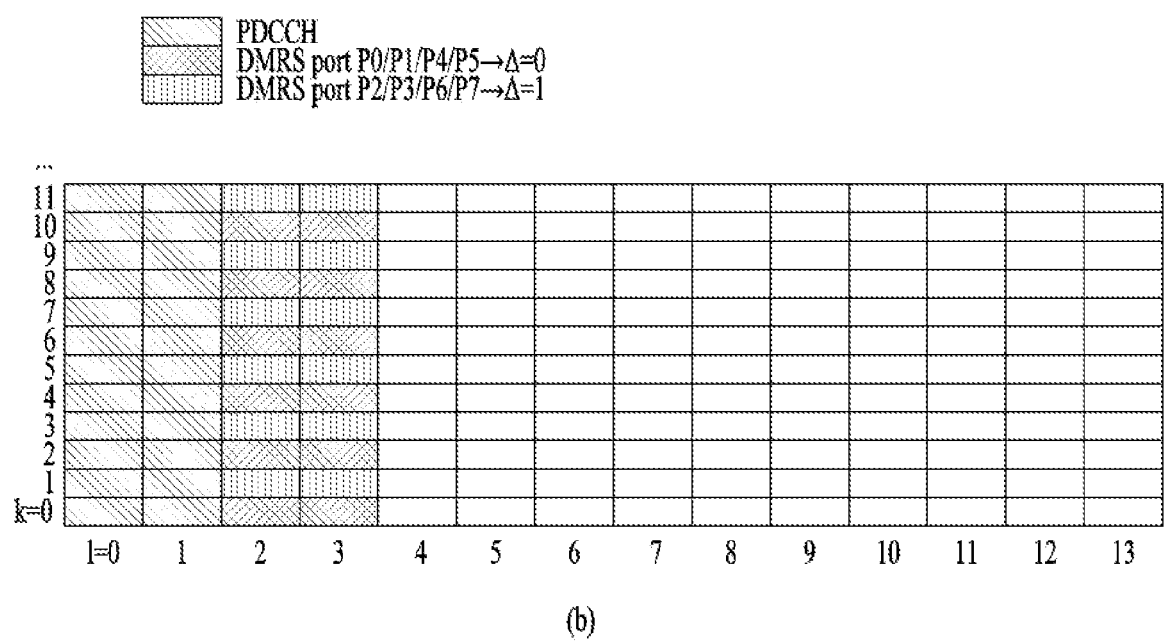
(b)

FIG. 14
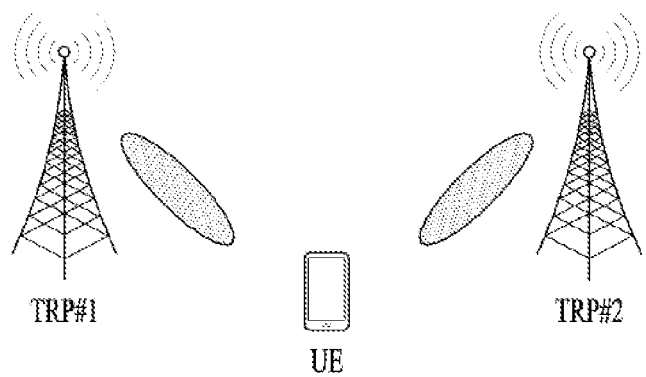
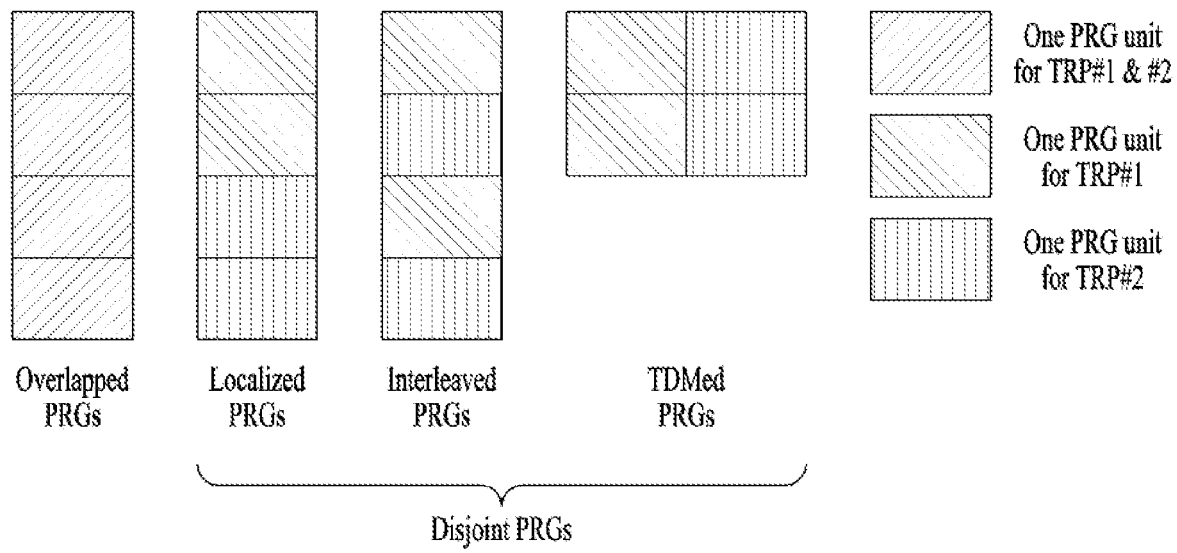

METHOD AND APPARATUS FOR RECEIVING DOWNLINK CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2019/017666, filed on Dec. 13, 2019, which claims the benefit of earlier filing date and right of priority to Korean Application No. 10-2018-0160983, filed on Dec. 13, 2018, the contents of which is incorporated by reference herein in its entirety.

TECHNICAL FIELD

The following description relates to a wireless communication system, and more particularly, to a method of operating a terminal and a base station related to an operation of determining a transport block size (TBS) related to data information in a terminal performs an initial access to a base station in a wireless communication system, and in acquiring the data information from a plurality of transmission reception points (TRPs) included in the base station, and a device supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more communication devices have demanded higher communication capacity, enhanced mobile broadband (eMBB) communication technology relative to legacy radio access technology (RAT) has been introduced. In addition, a communication system considering services/UEs sensitive to reliability and latency as well as massive machine type communication (MTC) for providing various services anytime and anywhere by connecting a plurality of devices and objects to each other has been introduced. Thus, eMBB communication, massive MTC, ultra-reliable and low-latency communication (URLLC), etc. have been introduced and various configurations therefor have been proposed.

DISCLOSURE

Technical Problem

An object of the present disclosure is to provide a method of operating a terminal and a base station in a wireless communication system, and devices supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of operating a terminal and a base station in a wireless communication system, and devices therefor.

As an example of the present disclosure, provided herein is a method of operating a terminal in a wireless communication system, the method including: receiving a sync signal/physical broadcast channel (SS/PBCH) block including an SS and a PBCH from a base station; performing a procedure of access to the base station including transmission of a random access channel (RACH) preamble based on the received SS/PBCH block; receiving downlink control information (DCI) from the base station, the DCI including a plurality of transmission configuration indicator (TCI) states and information for two transport blocks (TBs); acquiring, from the base station, mode information related to a first mode for transmission of a plurality of data, the data being based on the same information; based on the DCI and the mode information, assuming that data reception is scheduled from a plurality of transmission reception points (TRPs) by the DCI, and that data received from the plurality of TRPs is based on the same information; based on the assumption, determining a transport block size (TBS) related to the data based on information related to one TB between the two TBs related to the DCI; and acquiring data information from the plurality of TRPs based on the TBS.

As an example applicable to the present disclosure, the information related to the one TB may be related to TB related to a codeword having self-decodable redundancy version (RV) information between the two codewords related to the DCI.

Herein, the self-decodable RV information may include information related to RV index 0 or RV index 3.

As another example applicable to the present disclosure, the information related to the one TB may be related to a codeword having a first codeword index between two codewords related to the DCI.

As another example applicable to the present disclosure, the information related to the one TB may be related to a physical downlink shared channel (PDSCH) related to a first TCI state among the plurality of TCI states related to the DCI.

As another example applicable to the present disclosure, the information related to the one TB may be related to a codeword having a large TBS between two codewords related to the DCI.

As another example applicable to the present disclosure, the information related to the one TB may be related to a codeword indicated by the base station between two codewords related to the DCI.

Herein, the codeword indicated by the base station may be determined based on new data indicator (NDI) information related to a second TB in information for the two TBs in the DCI.

In the present disclosure, a modulation order of the one TB may be determined based on the information related to the one TB, and a modulation order of the other TB between the two TBs may be determined based on information related to the other TB between the two TBs.

Herein, the information related to the other TB includes at least one of the following information:

at least one bit information of new data indicator (NDI) information related to the other TB;

at least one bit information of modulation and coding scheme (MCS) information related to the other TB; or redundancy version (RV) information related to the other TB.

In the present disclosure, the method of operating the terminal may further include transmitting one acknowledgment information to the base station in response to the data information acquired from the plurality of TRPs.

In the present disclosure, each of the plurality of TCI states may be related to one reference signal (RS) set.

In the present disclosure, the mode information may be received through higher layer signaling including radio resource control (RRC) signaling.

As another example of the present disclosure, provided herein is a terminal operating in a wireless communication system, the terminal including at least one transmitter, at least one receiver, at least one processor, and at least one memory operably connected to the at least one processor and configured to store instructions causing the at least one processor to perform a specific operation when executed, wherein the specific operation includes: receiving a sync signal/physical broadcast channel (SS/PBCH) block including an SS and a PBCH from a base station; performing a procedure of access to the base station including transmission of a random access channel (RACH) preamble based on the received SS/PBCH block; receiving downlink control information (DCI) from the base station, the DCI including a plurality of transmission configuration indicator (TCI) states and information for two transport blocks (TBs); acquiring, from the base station, mode information related to a first mode for transmission of a plurality of data, the data being based on the same information; based on the DCI and the mode information, assuming that data reception is scheduled from a plurality of transmission reception points (TRPs) by the DCI, and that data received from the plurality of TRPs is based on the same information; based on the assumption, determining a transport block size (TBS) related to the data based on information related to one TB between the two TBs related to the DCI; and acquiring data information from the plurality of TRPs based on the TBS.

In the present disclosure, the terminal may communicate with at least one of a mobile terminal, a network, or an autonomous vehicle other than a vehicle including the terminal.

As another example of the present disclosure, provided herein is a base station operating in a wireless communication system, the base station including at least one transmitter; at least one receiver; at least one processor; and at least one memory operably connected to the at least one processor and configured to store instructions causing the at least one processor to perform a specific operation when executed, wherein the specific operation includes: transmitting a sync signal/physical broadcast channel (SS/PBCH) block including an SS and a PBCH to a terminal; performing a procedure of establishing a connection with the terminal based on the transmitted SS/PBCH block; transmitting downlink control information (DCI) including a plurality of transmission configuration indicator (TCI) states to the terminal; transmitting DCI to the terminal, the DCI including a plurality of TCI states and information for two transport blocks (TB); providing the terminal with mode information related to a first mode for transmission of a plurality of data, the data being based on the same information; and based on the DCI and the mode information, transmitting data information to the terminal through a plurality of transmission reception points (TRPs), wherein a transport block size (TBS) related to the data information is related to information related to one of the two TBs related to the DCI.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

Advantageous Effects

Embodiments of the present disclosure have the following effects.

When a base station transmits data to a terminal through a plurality of TRPs based on the same information, methods of determining the size of a transport block (TB) of the data transmitted and received between the base station and the terminal may be contradictory or ambiguous.

According to the present disclosure, the base station and the terminal address this issue and assume/consider the same TBS. Accordingly, the base station and the terminal may transmit and receive data information to and from each other with high reliability.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 11 is a diagram schematically illustrating an example of a front loaded DMRS of a first DMRS configuration type according to the present disclosure.

FIG. 14 is a diagram schematically illustrating a configuration in which a user equipment (UE) receives PDSCH through two TRPs/beams.

BEST MODE

Figure 1:
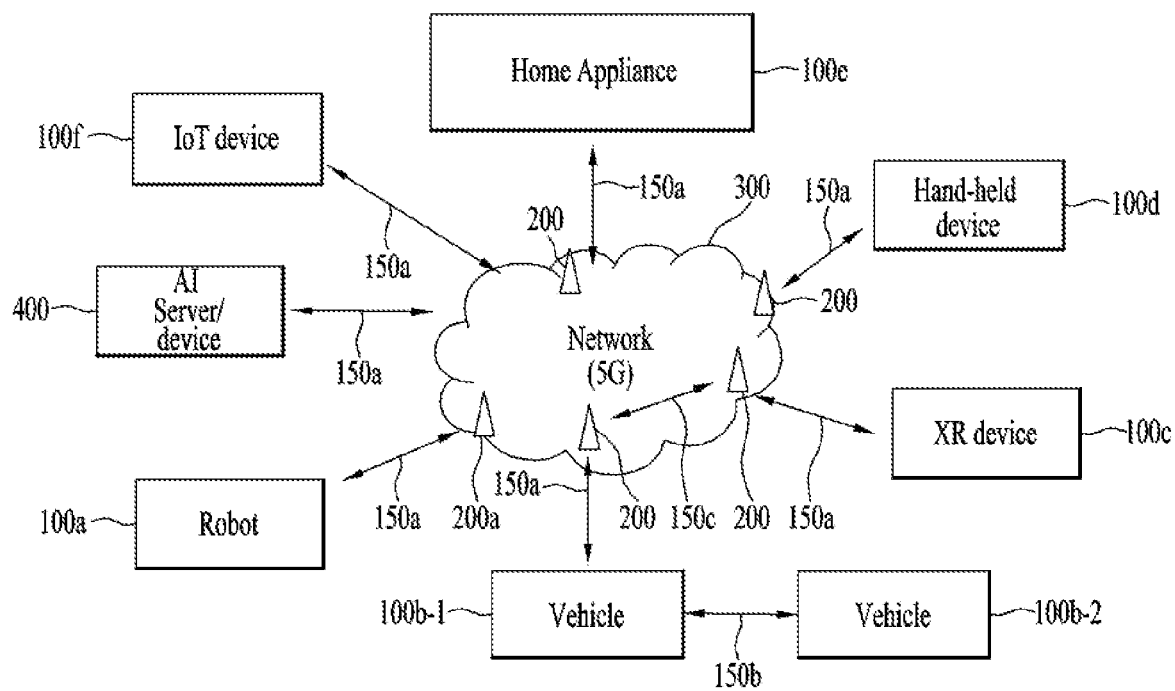
FIG. 1 illustrates a communication system applied to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term UE may be replaced with a UE, a mobile station (MS), a subscriber station (SS), a mobile subscriber station (MSS), a mobile UE, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an institute of electrical and electronics engineers (IEEE) 802.xx system, a 3rd generation partnership project (3GPP) system, a 3GPP long term evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1. Example of Communication System to which Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 1 illustrates a communication system 1 applied to the present disclosure.

Referring to FIG. 1, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

2. Example of Wireless Device to which Present Disclosure is Applied

Figure 2:
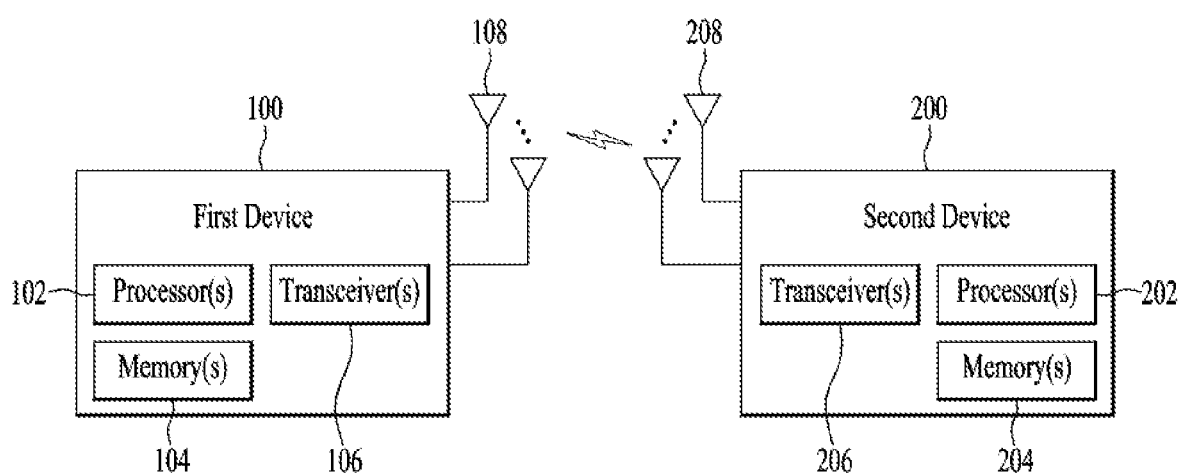
FIG. 2 illustrates wireless devices applicable to the present disclosure.

FIG. 2 illustrates wireless devices applicable to the present disclosure.

Referring to FIG. 2, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

3. Use Case of Wireless Device to which Present Disclosure is Applied

Figure 3:
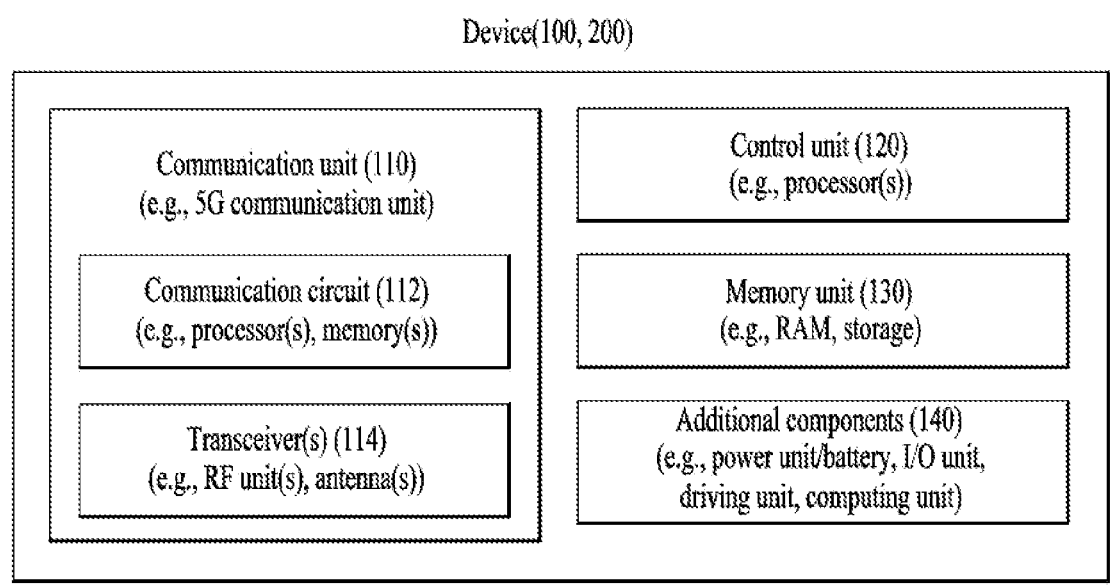
FIG. 3 illustrates another example of a wireless device applied to the present disclosure.

FIG. 3 illustrates another example of a wireless device applied to the present disclosure. The wireless device may be implemented in various forms according to a use case/service (refer to FIG. 1).

Referring to FIG. 3, wireless devices 100 and 200 may correspond to the wireless devices 100 and 200 of FIG. 1 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 1. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcasting terminal, a hologram device, a public safety device, an MTC device, a medical device, a FinTech device (or a finance device), a security device, a climate/environment device, the AI server/device (400 of FIG. 1), the BSs (200 of FIG. 1), a network node, or the like. The wireless device may be mobile or fixed according to a use case/service.

In FIG. 3, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Hereinafter, the implementation example of FIG. 13 will be described in more detail with reference to the drawings.

3.1. Example of a Hand-Held Device to which Present Disclosure is Applied

Figure 4:
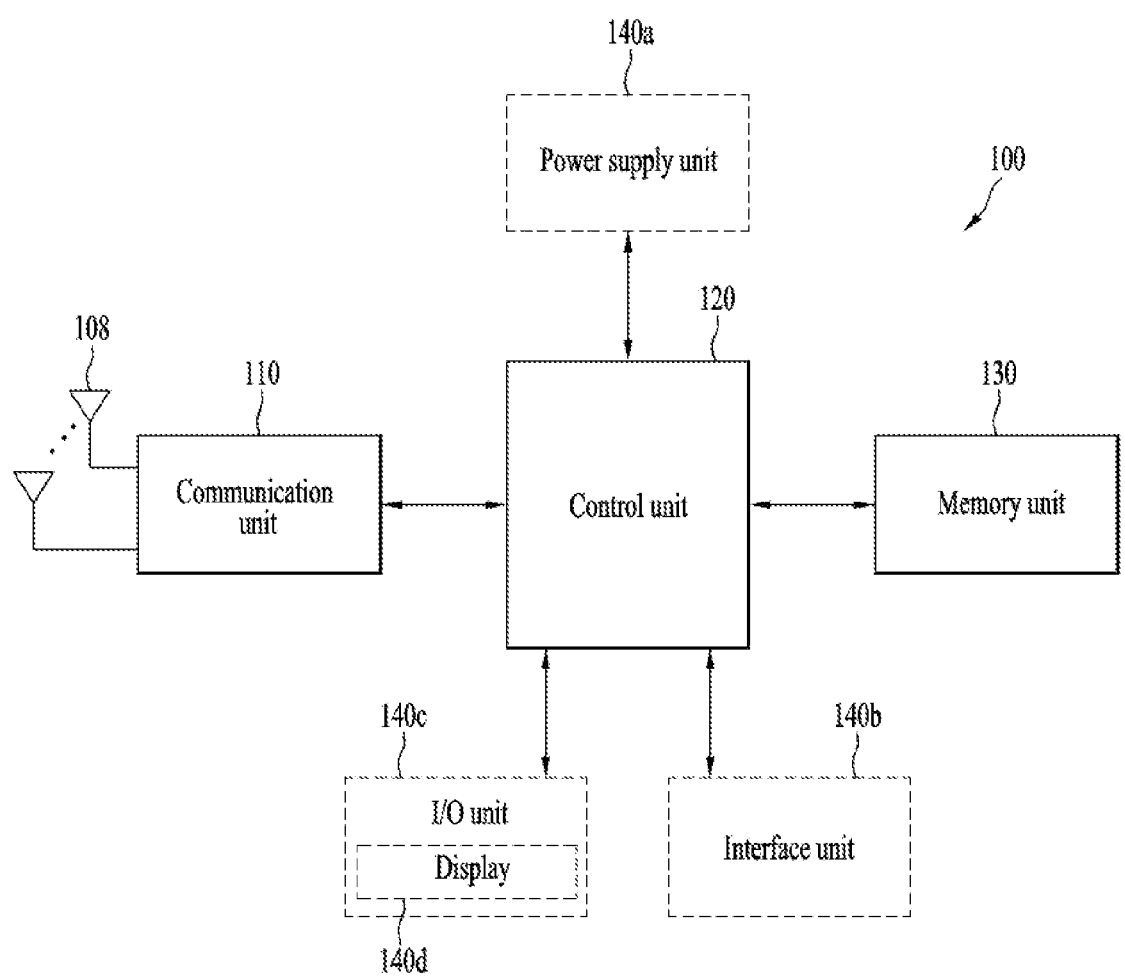
FIG. 4 illustrates a hand-held device applied to the present disclosure.

FIG. 4 illustrates a hand-held device applied to the present disclosure. The hand-held device may include a smartphone, a smartpad, a wearable device (e.g., a smartwatch or smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 4, a hand-held device 100 may include an antenna unit 108, a communication unit 110, a control unit 120, a memory unit 130, a power supply unit 140*a*, an interface unit 140*b*, and an input/output (I/O) unit 140*c*. The antenna unit 108 may be configured as a part of the communication unit 110. Blocks 110 to 130/140*a* to 140*c* correspond to the blocks 110 to 130/140 of FIG. 1, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/instructions needed to drive the hand-held device 100. The memory unit 130 may also store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection to external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may covert the information/signals stored in the memory into radio signals and transmit the converted radio signals to other wireless devices directly or to the BS. The communication unit 110 may receive radio signals from other wireless devices or the BS and then restore the received radio signals into original information/signals. The restored information/signals may be stored in the memory unit 130 and may be output as various types (e.g., text, voice, image, video, or haptic type) through the I/O unit 140c.

Figure 5:
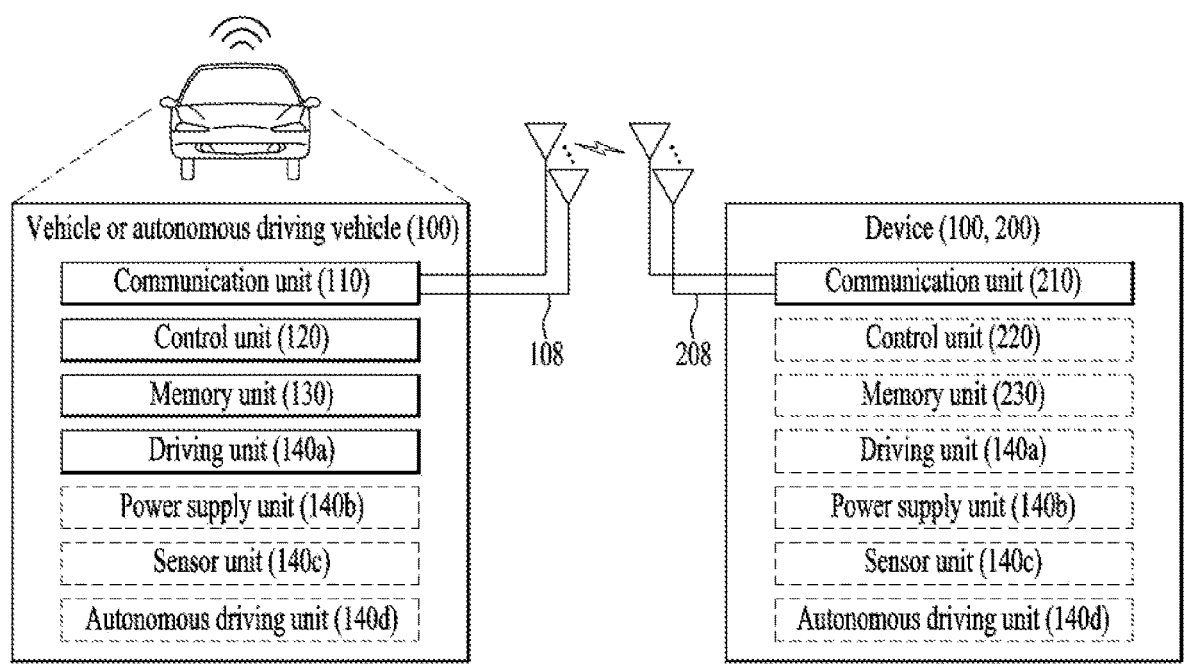
FIG. 5 illustrates a vehicle or an autonomous driving vehicle applied to the present disclosure.

3.2. Example of Vehicle or Autonomous Driving Vehicle to which Present Disclosure is Applied FIG. 5 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 5, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 4, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

4. NR System

4.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

Figure 6:
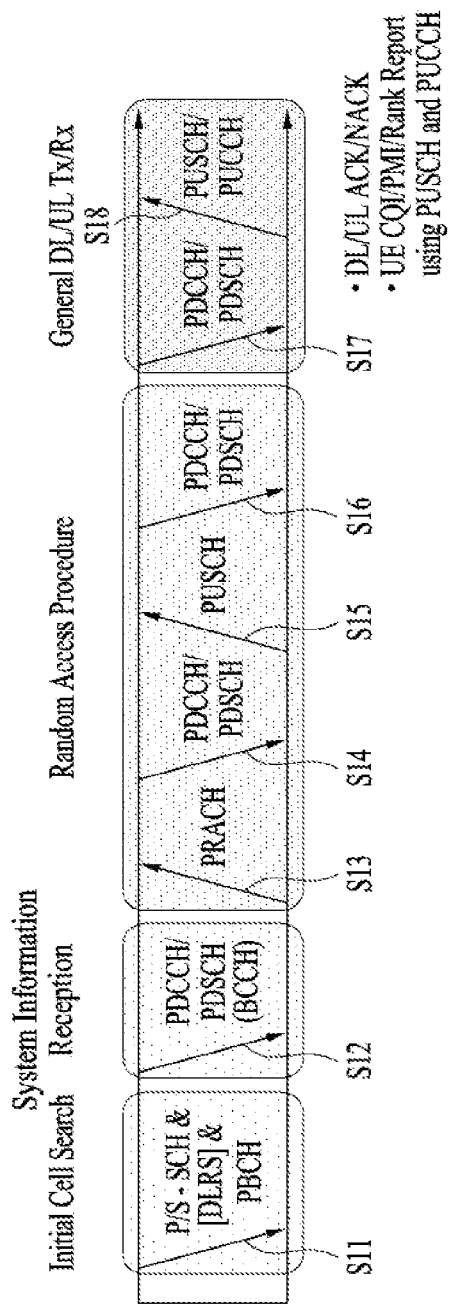
FIG. 6 is a diagram illustrating physical channels and a general signal transmission method using the physical channels.

FIG. 6 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARQ) acknowledgement (ACK)/negative ACK (HACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted periodically on the PUSCH, upon receipt of a request/command from a network.

4.2. Radio Frame Structure

Figure 7:
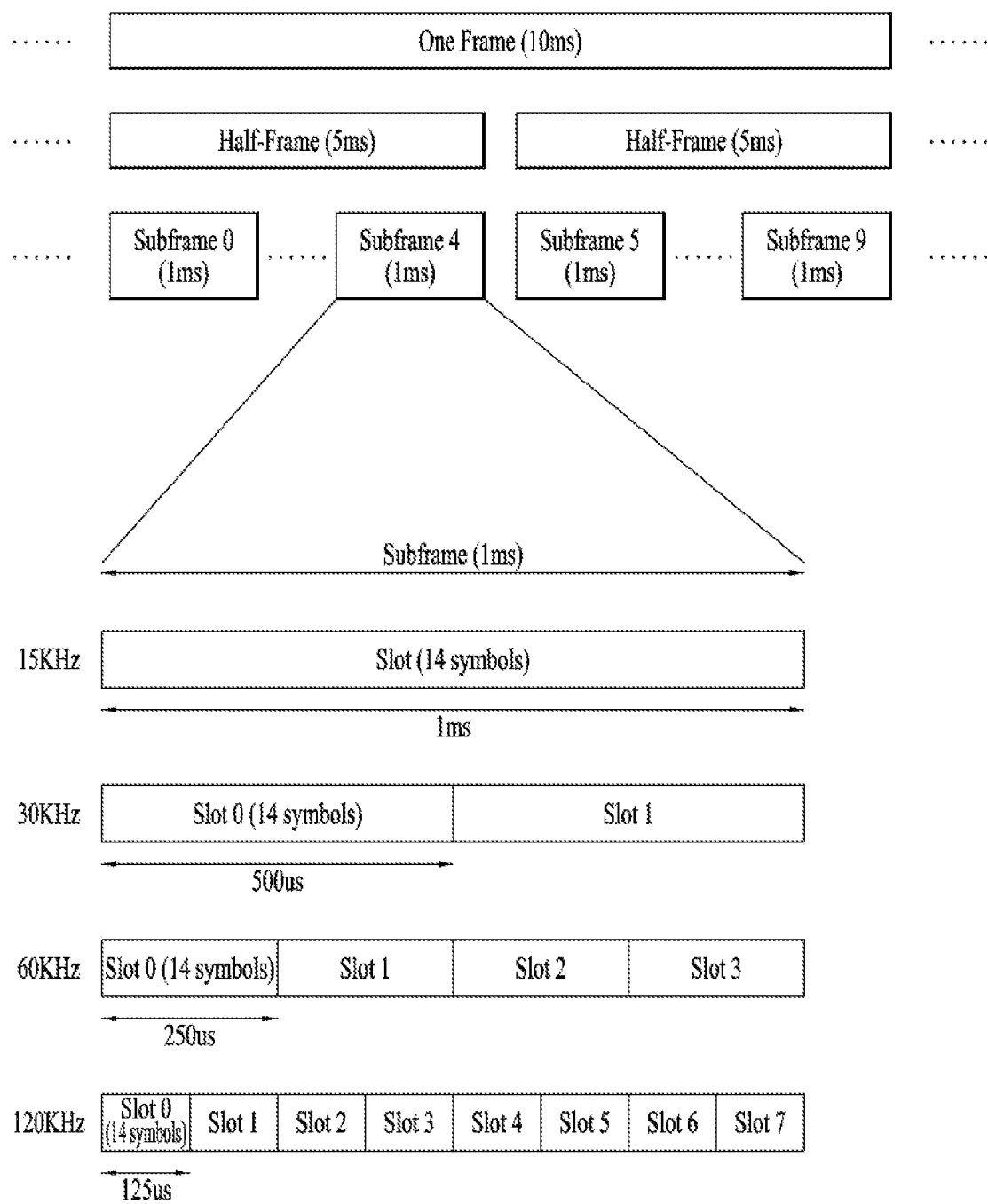
FIG. 7 is a diagram illustrating a radio frame structure in an NR system to which embodiments of the present disclosure are applicable.

FIG. 7 is a diagram illustrating a radio frame structure in an NR system to which embodiments of the present disclosure are applicable.

In the NR system, UL and DL transmissions are based on a frame as illustrated in FIG. 2. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

The NR supports multiple numerologies (or subcarrier spacings (SCSs)) to support various 5G services. For example, when the SCS is 15 kHz, a wide area in the conventional traditional cellular bands is supported. When the SCS is 30 kHz/60 kHz, a dense-urban area, lower latency, and a wider carrier bandwidth are supported. When the SCS is 60 kHz or higher, a bandwidth greater than 24.25 GHz is supported to overcome phase noise.

The NR frequency band is defined as a frequency range of two types FR1 and FR2. FR1 and FR2 may be configured as shown in the table below. Here, FR2 may mean a millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 8:
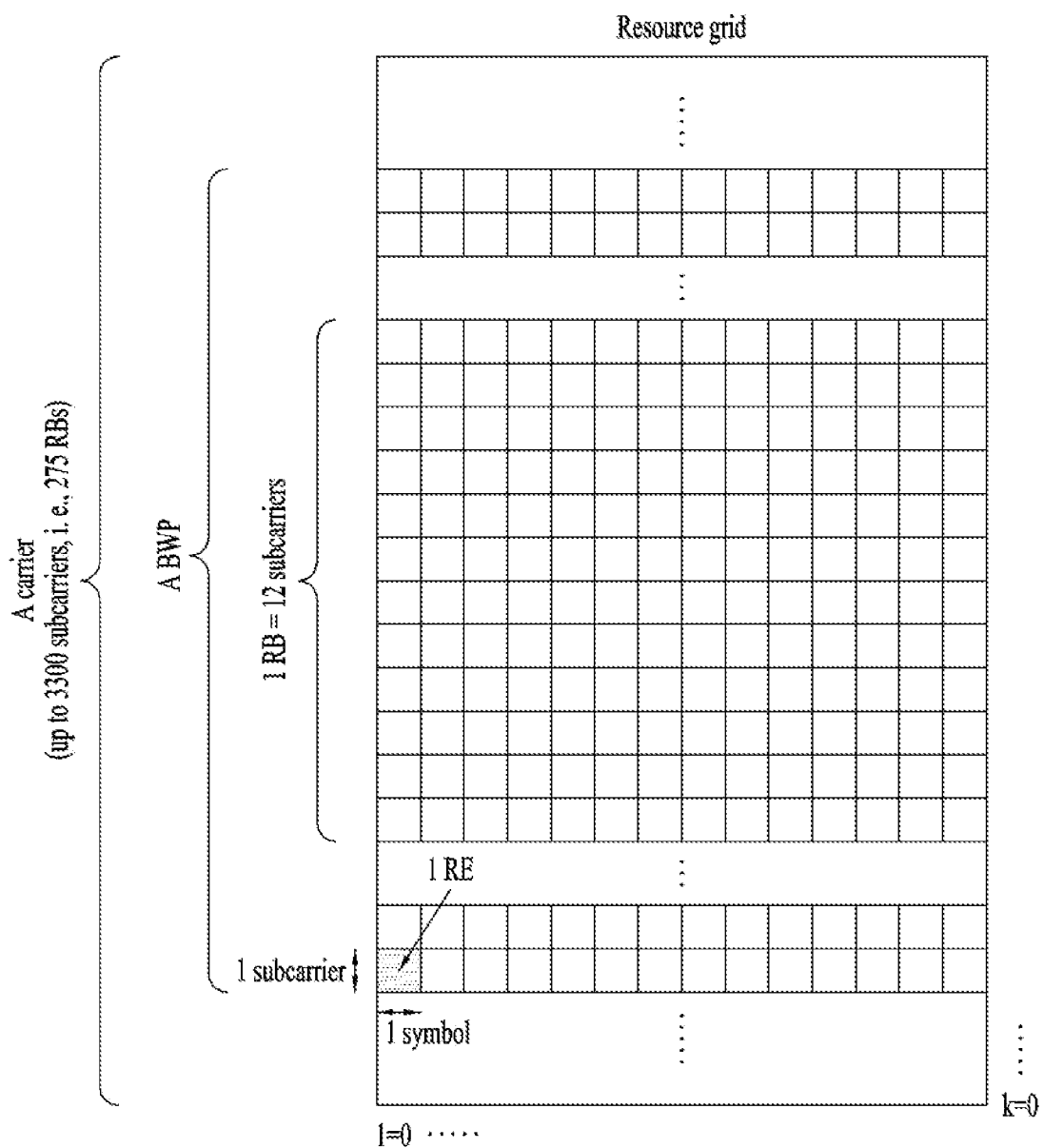
FIG. 8 is a diagram illustrating a slot structure in an NR system to which embodiments of the present disclosure are applicable.

FIG. 8 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., subcarrier spacing (SCS), CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 9:
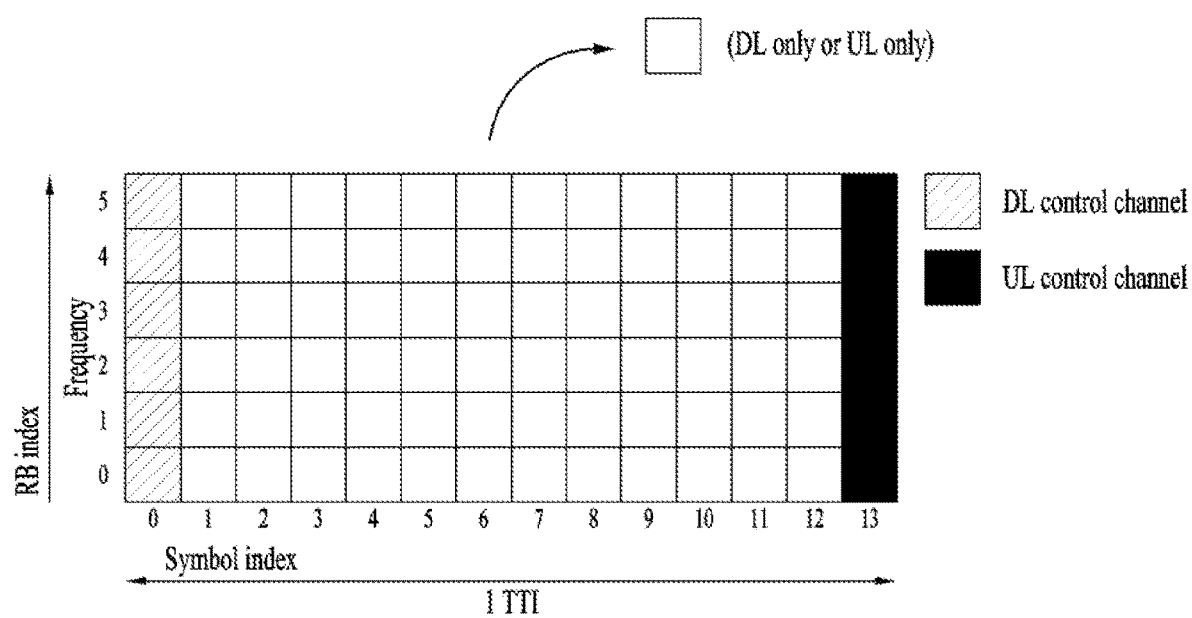
FIG. 9 is a diagram illustrating a self-contained slot structure in an NR system to which embodiments of the present disclosure are applicable

FIG. 9 is a diagram illustrating a self-contained slot structures in an NR system to which embodiments of the present disclosure are applicable.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a base station and a UE may sequentially perform DL transmission and UL transmission in one slot. That is, the base station and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the base station and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 4.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 10:
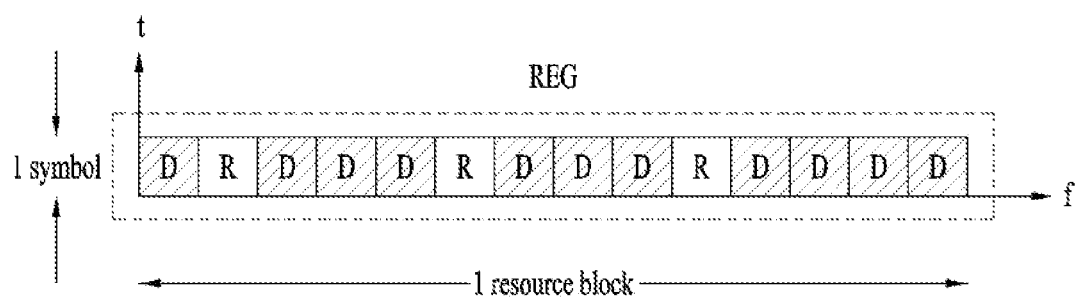
FIG. 10 is a diagram illustrating the structure of one REG in an NR system to which embodiments of the present disclosure are applicable.

FIG. 10 is a diagram illustrating the structure of one REG in an NR system to which embodiments of the present disclosure are applicable.

In FIG. 10, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 4 lists exemplary PUCCH formats.

TABLE 4

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |

TABLE 4-continued

| PUCCH format | Length in OFDM symbols $N_{symb}^{PUCCH}$ | Number of bits | Usage | Etc |
| --- | --- | --- | --- | --- |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the base station by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same physical resource blocks (PRBs) and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBs and conveys UCI of more than 2 bits. In other words, PUCCH resources of PUCCH format 3 includes an OCC. Modulation symbols are transmitted in TDM with the DMRS.

4.3. DCI Format

In the NR system to which the present disclosure is applicable, the following DCI formats may be supported. First, the NR system may support DCI format 0_0 and DCI format 0_1 as DCI formats for PUSCH scheduling and support DCI format 1_0 and DCI format 1_1 as DCI formats for PDSCH scheduling. In addition, as DCI formats usable for other purposes, the NR system may additionally support DCI format 2_0, DCI format 2_1, DCI format 2_2, and DCI format 2_3.

Herein, DCI format 0_0 is used to schedule a transmission block (TB)-based (or TB-level) PUSCH. DCI format 0_1 may be used to schedule a TB-based (or TB-level) PUSCH or a code block group (CBG)-based (or CBG-level) PUSCH (in the case where CBG-based signal transmission and reception is configured).

In addition, DCI format 1_0 may be used to schedule TB-based (or TB-level) PDSCH. DCI format 1_1 may be used to schedule TB-based (or TB-level) PDSCH or CBG-based (or CBG-level) PDSCH (in the case where CBG-based signal transmission and reception is configured).

In addition, DCI format 2_0 may be used to notify a slot format. DCI format 2_1 may be used to notify PRB(s) and OFDM symbol(s) in which a UE assumes that no transmission is intended therefor. DCI format 2_2 may be used to transmit transmission power control (TPC) commands for a PUCCH and a PUSCH. DCI format 2_3 may be used to transmit a group of TPC commands for SRS transmission by one or more UEs.

More specifically, DCI format 1_1 may include an MCS/NDI (New Data Indicator)/RV (Redundancy Version) field for TB 1, and may further include an MCS/NDI/RV field for TB 2 only when a higher layer parameter maxNrofCodeWordsScheduledByDCI in the higher layer parameter PDSCH-Config is set to n2 (i.e., 2).

In particular, when the higher layer parameter maxNrofCodeWordsScheduledByDCI is set to n2 (i.e., 2), whether the TB is enabled/disabled may substantially be determined by a combination of the MCS field and the RV field. More specifically, when the MCS field has a value of 26 and the RV field has a value of 1 for a specific TB, the specific TB may be disabled.

Detailed features of the DCI formats may be supported by 3GPP TS 38.212. That is, obvious steps or parts which are not explained among the DCI format-related features may be explained with reference to the above document. In addition, all terms disclosed in the present document may be explained by the above standard document.

4.4. Control Resource Set (CORESET)

One CORESET includes $N^{CORESET}_{RB}$ RBs in the frequency domain and $N^{CORESET}_{symb}$ (equal to 1, 2, or 3) symbols in the time domain.

One control channel element (CCE) includes 6 resource element groups (REGs) and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping.

CCE-to-REG mapping for one CORESET may be interleaved or non-interleaved.

Configuration information for the CORESET may be configured by a higher layer parameter ControlResourceSet IE.

In addition, configuration information for CORESET 0 (e.g., common CORESET) may be configured by a higher layer parameter ControlResourceSetZero IE.

4.5. Antenna Port Quasi Co-Location

One UE may be configured with a list of up to M transmission configuration indicator (TCI) state configurations. The M TCI-state configurations may be configured by a higher layer parameter PDSCH-Config to decode a PDSCH (by the UE) according to a detected PDCCH with DCI intended for the UE and the given serving cell. Herein, M may be determined depending on the capability of the UE.

Each TCI-state contains parameters for configuring a quasi co-location (QCL) relationship between one or two DL reference signals and the DMRS ports of the PDSCH. The QCL relationship is configured by the higher layer parameter qcl-Type1 for a first DL RS and a higher layer parameter qcl-Type2 for a second DL RS (if configured). For the case of two DL RSs, the QCL types shall not be the same, regardless of whether the RSs are the same DL RS or different DL RSs. The QCL type corresponding to each DL RS is given by a higher layer parameter qcl-Type within a higher layer parameter QCL-Info and may have one of the following values.

- 'QCL-TypeA': {Doppler shift, Doppler spread, average delay, delay spread};
- 'QCL-TypeB': {Doppler shift, Doppler spread};
- 'QCL-TypeC': {Doppler shift, average delay}; and
- 'QCL-TypeD': {Spatial Rx parameter}.

The UE receives an activation command used to map up to 8 TCI states to codepoints of a TCI field in the DCI. When a HARQ-ACK signal corresponding to the PDSCH carrying the activation command is transmitted in slot #n, mapping between the TCI states and codepoints of the TCI field in the DCI may be applied starting from slot #(n+3*$N^{subframe,\mu}_{slot}$+1). Here, $N^{subframe,\mu}_{slot}$ is determined based on Table 1 or Table 2 described above. After the UE receives initial higher layer configuration of the TCI states and before the UE receives the activation command, the UE assumes that DM-RS port(s) of a PDSCH of a serving cell are quasi co-located with an SS/PBCH block determined in the initial access procedure in terms of 'QCL-TypeA'. Additionally, the UE may assume that the DM-RS port(s) of the PDSCH of the serving cell are quasi co-located with the SS/PBCH block determined in the initial access procedure in terms of 'QCL-TypeD' at the above timing.

When a higher layer parameter tci-PresentInDCI is set to 'enabled' for a CORESET scheduling the PDSCH, the UE assumes that the TCI field is present in a PDCCH of DCI format 1_1 transmitted on the CORESET. When the higher layer parameter tci-PresentInDCI is not configured for the CORESET scheduling the PDSCH, or the PDSCH is scheduled by DCI format 1_0 and a time offset between the reception of the DL DCI and the reception of the corresponding PDSCH is greater than or equal to a threshold Threshold-Sched-Offset (where the threshold is determined based on the reported UE capability), the UE assumes that a TCI state or QCL assumption for the PDSCH is identical to a TCI state or QCL assumption applied to a CORESET used for PDCCH transmission, in order to determine PDSCH antenna port QCL.

When the PDSCH is scheduled by DCI format 1_1 while the higher layer parameter tci-PresentInDCI is set as 'enabled', and the TCI field in the DCI for scheduling a component carrier (CC) points to activated TCI states in the scheduled CC or a DL BW, the UE uses a TCI-state according to the TCI field in the DCI in a detected PDCCH to determine PDSCH antenna port QCL. When the time offset between the reception of the DL DCI and the reception of the corresponding PDSCH is greater than or equal to the threshold Threshold-Sched-Offset (wherein the threshold is determined based on the reported UE capability), the UE may assume that the DMRS port(s) of the PDSCH of a serving cell are quasi co-located with RS(s) in the TCI state for QCL type parameter(s) given by an indicated TCI state. When the UE is configured with a single slot PDSCH, the indicated TCI state should be based on the activated TCI states in a slot for the scheduled PDSCH. When CORESET associated with a search space set for cross-carrier scheduling is configured for the UE, the UE expects that the higher layer parameter tci-PresentInDci is set as 'enabled' for the CORESET. When one or more TCI states configured for the serving cell scheduled by the search space set contain 'QCL-TypeD', the UE expects that the time offset between the reception of the detected PDCCH in the search space set and the reception of the corresponding PDSCH is greater than or equal to the threshold timeDurationForQCL.

For both the cases when higher layer parameter tci-PresentInDCI is set to 'enabled' and the higher layer parameter tci-PresentInDCI is not configured in RRC connected mode, if the offset between the reception of the DL DCI and the reception of the corresponding PDSCH is less than the threshold Threshold-Sched-Offset, the UE makes the following assumptions: (i) DM-RS ports of a PDSCH of a serving cell are quasi co-located with the RS(s) in a TCI state with respect to QCL parameter(s); (ii) the QCL parameter(s) are used for PDCCH QCL indication of the CORESET associated with a monitored search space with the lowest CORESET-ID in the latest slot in which one or more CORESETs within an active BWP of the serving cell are monitored by the UE.

In this case, when the 'QCL-TypeD' of a PDSCH DM-RS is different from 'QCL-TypeD' of a PDCCH DM-RS overlapping therewith in at least one symbol, the UE is expected to prioritize the reception of the ePDCCH associated with the corresponding CORESET. This operation may also be applied to the case of intra-band CA (when the PDSCH and the CORESET are on different CCs). When none of the configured TCI states contains 'QCL-TypeD', the UE obtains the other QCL assumptions from the indicated TCI states for a scheduled PDSCH irrespective of the time offset between the reception of the DL DCI and the reception of the corresponding PDSCH.

For a periodic CSI-RS resource in an NZP-CSI-RS-ResourceSet configured with a higher layer parameter trs-Info, the UE should assume that that a TCI state indicates one of the following QCL type(s):

'QCL-TypeC' for an SS/PBCH block and, when (QCL-TypeD) is applicable, 'QCL-TypeD' for the same SS/PBCH block; or 'QCL-TypeC' with an SS/PBCH block and, when (QCL-TypeD) is applicable, 'QCL-TypeD' with a periodic CSI-RS resource in a higher layer parameter NZPCSI-RS-ResourceSet configured with the higher layer parameter repetition.

For a CSI-RS resource in the higher layer parameter NZP-CSI-RS-ResourceSet configured without the higher layer parameter trs-Info and without the higher layer parameter repetition, the UE should assume that a TCI state indicates one of the following QCL type(s):

'QCL-TypeA' for a CSI-RS resource in the higher layer parameter NZP-CSI-RS-ResourceSet configured with the higher layer parameter trs-Info and, when (QCL-TypeD) is applicable, 'QCL-TypeD' for the same CSI-RS resource; or 'QCL-TypeA' for a CSI-RS resource in the higher layer parameter NZP-CSI-RS-ResourceSet configured with the higher layer parameter trs-Info and, when (QCL-TypeD) is applicable, 'QCL-TypeD' for an SS/PBCH; or 'QCL-TypeA' for a CSI-RS resource in the higher layer parameter NZP-CSI-RS-ResourceSet configured with the higher layer parameter trs-Info and, when (QCL-TypeD is) applicable, 'QCL-TypeD' for a periodic CSI-RS resource in the higher layer parameter NZP-CSI-RS-ResourceSet configured with the higher layer parameter repetition; or 'QCL-TypeB' for a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE should assume that a TCI state indicates one of the following QCL type(s):

'QCL-TypeA' for a CSI-RS resource in the higher layer parameter NZP-CSI-RS-ResourceSet configured with the higher layer parameter trs-Info and, when ('QCL-TypeD' is) applicable, 'QCL-TypeD' for the same CSI-RS resource; or 'QCL-TypeA' for a CSI-RS resource in the higher layer parameter NZP-CSI-RS-ResourceSet configured with the higher layer parameter trs-Info and, when ('QCL-TypeD' is) applicable, 'QCL-TypeD' for a CSI-RS resource in the higher layer parameter NZP-CSI-RS-ResourceSet configured with the higher layer parameter repetition; or 'QCL-TypeC' for an SS/PBCH block and, when (QCL-TypeD) is applicable, 'QCL-TypeD' for the same SS/PBCH block.

For the DMRS of PDCCH, the UE should assume that a TCI state indicates one of the following QCL type(s):

'QCL-TypeA' for a CSI-RS resource in the higher layer parameter NZP-CSI-RS-ResourceSet configured with the higher layer parameter trs-Info and, when ('QCL-TypeD' is) applicable, 'QCL-TypeD' for the same CSI-RS resource; or 'QCL-TypeA' for a CSI-RS resource in the higher layer parameter NZP-CSI-RS-ResourceSet configured with the higher layer parameter trs-Info and, when ('QCL-TypeD' is) applicable, 'QCL-TypeD' for a CSI-RS resource in the higher layer parameter NZP-CSI-RS-ResourceSet configured with higher layer parameter repetition; or 'QCL-TypeA' for a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' for the same CSI-RS resource.

For the DM-RS of the PDSCH, the UE should assume that a TCI state indicates one of the following QCL type(s):

'QCL-TypeA' for a CSI-RS resource in the higher layer parameter NZP-CSI-RS-ResourceSet configured with the higher layer parameter trs-Info and, when (QCL-TypeD) is applicable, 'QCL-TypeD' for the same CSI-RS resource; or 'QCL-TypeA' for a CSI-RS resource in the higher layer parameter NZP-CSI-RS-ResourceSet configured with the higher layer parameter trs-Info and, when (QCL-TypeD) is applicable, 'QCL-TypeD' for a CSI-RS resource in the higher layer parameter NZP-CSI-RS-ResourceSet configured with the higher layer parameter repetition; or 'QCL-TypeA' for a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' for the same CSI-RS resource.

In this document, QCL signaling may include all signaling configurations listed in the table below.

TABLE 5

| QCL linkage for FR2 after RRC signalling | |
| --- | --- |
| SSB → TRS w.r.t. average delay, Doppler shift, spatial RX parameters | QCL type: C + D |
| TRS → CSI-RS for BM w.r.t. average delay, Doppler shift, delay spread, Doppler spread estimation | QCL type: A + D |
| TRS → CSI-RS for CSI w.r.t. average delay, Doppler shift, delay spread, Doppler spread estimation | QCL type: A |
| TRS → DMRS for PDCCH w.r.t. average delay, Doppler shift, delay spread, Doppler spread estimation | QCL type: A + D |
| TRS → DMRS for PDSCH w.r.t. average delay, Doppler shift, delay spread, Doppler spread estimation | QCL type: A + D |
| SSB → CSI-RS for BM w.r.t. average delay, Doppler shift, spatial RX parameters | QCL type: C + D |
| SSB → CSI-RS for CSI w.r.t. spatial RX parameters | QCL type: D |
| SSB → DMRS for PDCCH (before TRS is configured) w.r.t. average delay, Doppler shift, delay spread, Doppler spread, spatial RX parameters | QCL type: A + D |
| SSB → DMRS for PDSCH (before TRS is configured) w.r.t. average delay, Doppler shift, delay spread, Doppler spread, spatial RX parameters | QCL type: A + D |
| CSI-RS for BM → DMRS for PDCCH w.r.t. spatial RX parameters | QCL type: D |
| CSI-RS for BM → DMRS for PDSCH w.r.t. spatial RX parameters | QCL type: D |
| CSI-RS for CSI → DMRS for PDSCH w.r.t. average delay, Doppler shift, delay spread, Doppler spread, spatial RX parameters; Note: QCL parameters may not be derived directly from CSI-RS for CSI | QCL type: A + D |
| CSI-RS for BM → CSI-RS for TRS/BM/CSI w.r.t. spatial RX parameters | QCL type: D |

In the following tables, when there are rows having the same RS type in the tables below, the same RS ID may be assumed for the rows.

In the present disclosure, when there is a CSI-RS resource configured by the higher layer parameter NZP-CSI-RS-ResourceSet along with the higher layer parameter trs-Info, the UE may expect only the following two possible configurations for the higher layer parameter TCI-state.

TABLE 6

| Valid TCI state Configuration | DL RS 1 | qcl-Type1 | DL RS 2 (if configured) | qcl-Type2 (if configured) |
| --- | --- | --- | --- | --- |
| 1* | SS/PBCH Block | QCL-TypeC | SS/PBCH Block | QCL-TypeD |
| 2* | SS/PBCH Block | QCL-TypeC | CSI-RS (BM) | QCL-TypeD |

In the table above, * may denote that DL RS 2 and QCL type-2 may be configured for the UE when QCL type-D is applicable.

As another example, when there is a CSI-RS resource configured by the higher layer parameter NZP-CSI-RS-ResourceSet without the higher layer parameter trs-Info and without the higher layer parameter repetition, the UE may expect only the following three possible configurations for the higher layer parameter TCI-state.

TABLE 7

| Valid TCI state Configuration | DL RS 1 | qcl-Type1 | DL RS 2 (if configured) | qcl-Type2 (if configured) |
| --- | --- | --- | --- | --- |
| 1** | TRS | QCL-TypeA | TRS | QCL-TypeD |
| 2** | TRS | QCL-TypeA | SS/PBCH Block | QCL-TypeD |
| 3** | TRS | QCL-TypeA | CSI-RS (BM) | QCL-TypeD |
| 4* | TRS | QCL-TypeB | | |

In the table above, * may denote that QCL type-D is not applicable.

In the table above, ** may denote that DL RS 2 and QCL type-2 may be configured for the UE when QCL type-D is applicable.

As another example, when there is a CSI-RS resource configured by the higher layer parameter NZP-CSI-RS-ResourceSet along with the higher layer parameter repetition, the UE may expect only the following three possible configurations for the higher layer parameter TCI-state.

TABLE 8

| Valid TCI state Configuration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

In the tables given below, when QCL type-D is applicable, DL RS 2 and QLC type-2 may be configured for the UE except a default case (e.g., the fourth row in the two tables below). When a TRS for DL is used for QCL type-D, the TRS may have a reference signal (e.g., SSB or CSI-RS) for beam management (BM) as a source RS for QCL type-D.

For the DMRS of the PDCCH, the UE may expect only the following three possible configurations of the higher layer parameter TCI-state while the fourth configuration (the fourth row in the two tables below) is valid by default before the TRS is configured.

TABLE 9

| Valid TCI state Configuration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In the table above, * may denote a configuration applicable before the TRS is configured. In this case, the configuration may be construed as a valid QCL assumption rather than a TCI state.

In the table above, ** may denote that QCL parameters are not directly derived from the CSI-RS (CSI).

For the DMRS of the PDCCH, the UE may expect only the following three possible configurations of the higher layer parameter TCI-state while the fourth configuration (the fourth row in the two tables below) is valid by default before the TRS is configured.

TABLE 10

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In the table above, * may denote a configuration applicable before the TRS is configured. In this case, the configuration may be construed as a valid QCL assumption rather than a TCI state.

In the table above, ** may denote that QCL parameters are not directly derived from the CSI-RS (CSI).

For the DMRS of the PDCCH, the UE may expect only the following three possible configurations of the higher layer parameter TCI-State while the fourth configuration (the fourth row in the two tables below) is valid by default before the TRS is configured.

TABLE 11

| Valid TCI State Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In the table above, * may denote a configuration applicable before the TRS is configured. In this case, the configuration may be construed as a valid QCL assumption rather than a TCI state.

In the table above, ** may denote that QCL parameters are not directly derived from the CSI-RS (CSI).

4.6. Channel State Information Reference Signal (CSI-RS)

In a mobile communication system according to the present disclosure, a method of improving transmit/receive data efficiency by adopting multiple transmit antennas and multiple receive antennas is used for packet transmission. In transmitting and receiving data using multiple input/output antennas, a channel state between a transmit antenna and a receive antenna should be detected in order to accurately receive a signal. Thus, each transmit antenna may have a separate reference signal. In this case, a reference signal for feedback of channel state information (CSI) may be defined as a CSI-RS.

The CSI-RS includes a Zero Power (ZP) CSI-RS and a Non-Zero-Power (NZP) CSI-RS. Here, the ZP CSI-RS and the NZP CSI-RS may be defined as follows.

The NZP CSI-RS may be configured by the CSI-RS-Resource-Mobility field in the NZP-CSI-RS-Resource Information Element (IE) or CSI-RS-ResourceConfig-Mobility IE. The NZP CSI-RS may be defined based on a sequence generation method and resource mapping method defined in the 3GPP TS 38.211 standard specification.

The ZP CSI-RS may be configured by the ZP-CSI-RS-Resource IE. The UE may assume that resources configured for the ZP CSI-RS are not used for PDSCH transmission. The UE may perform the same measurement/reception on channels/signals except PDSCH regardless of whether they collide with ZP CSI-RS or not.

The position to which the CSI-RS is mapped in one slot may be dynamically determined by the number of CSI-RS ports, the CSI-RS density, Code Division Multiplexing (CDM)-Type, and higher layer parameters (e.g., firstOFDM-SymbolInTimeDomain, firstOFDMSymbolInTimeDomain2, etc.).

4.7. Demodulation Reference Signal (DMRS)

In the NR system according to the present disclosure, the DMRS may be transmitted and received in a front load structure. Alternatively, an additional DMRS may be transmitted/received in addition to the front loaded DMRS.

The front loaded DMRS may support fast decoding. The first OFDM symbol in which the front loaded DMRS is loaded may be determined as a third (e.g., l=2) or fourth (e.g., l=3) OFDM symbol. The position of the first OFDM symbol may be indicated by a physical broadcast channel (PBCH).

The number of OFDM symbols occupied by the front loaded DMRS may be indicated by a combination of downlink control information (DCI) and radio resource control (RRC) signaling.

The additional DMRS may be configured for a high-speed UE. The additional DMRS may be positioned in the middle/last symbol(s) in a slot. When one front loaded DMRS symbol is configured, the additional DMRS may be allocated to 0 to 3 OFDM symbols. When two front loaded DMRS symbols are configured, the additional DMRS may be allocated to 0 to 2 OFDM symbols.

The front loaded DMRS may include two types, and one of the two types may be indicated through higher layer signaling (e.g., RRC signaling).

In the present disclosure, the two DMRS configuration types may be applied. Of the two DMRS configuration types, a DMRS configuration type that is substantially configured for the UE may be indicated by higher layer signaling (e.g., RRC).

DMRS configuration type 1 may be classified according to the number of OFDM symbols to which the front loaded DMRS is allocated as follows.

Number of OFDM symbols to which DMRS configuration type 1 and the front loaded DMRS is allocated=1

Up to four ports (e.g., P0 to P3) may be multiplexed based on length-2 F-CDM (Frequency-Code Division Multiplexing) and FDM (Frequency Division Multiplexing). The RS density may be set to 6 REs per port in a resource block (RB).

Number of OFDM symbols to which DMRS configuration type 1 and the front loaded DMRS is allocated=2

Up to 8 ports (e.g., P0 to P7) may be multiplexed based on length-2 F-CDM, length-2 T-CDM (Time-Code Division Multiplexing) and FDM. Here, when the presence of the PT-RS is set by higher layer signaling, the T-CDM may be fixed to [1 1]. The RS density may be set to 12 REs per port in the RB.

DMRS configuration type 2 may be classified according to the number of OFDM symbols to which the front loaded DMRS is allocated as follows.

Number of OFDM symbols to which DMRS configuration type 2 and the front loaded DMRS are allocated=1

Up to six ports (e.g., P0 to P5) may be multiplexed based on length-2 F-CDM and FDM. The RS density may be set to 4 REs per port in the RB.

Number of OFDM symbols to which DMRS configuration type 2 and the front loaded DMRS are allocated=2

Up to 12 ports (e.g., P0 to P11) may be multiplexed based on length-2 F-CDM, length-2 T-CDM, and FDM. Here, when the presence of the PT-RS is set by higher layer signaling, the T-CDM may be fixed to [1 1]. The RS density may be set to 8 REs per port in the RB.

FIG. 11 is a diagram schematically illustrating an example of a front loaded DMRS of a first DMRS configuration type according to the present disclosure.

More specifically, FIG. 11(a) shows a front loaded DMRS with one symbol, and FIG. 11(b) shows a front loaded DMRS with two symbols.

In FIG. 11, $\Delta$ denotes the DMRS offset value in the frequency domain. DMRS ports having the same $\Delta$ may be subjected to code division multiplexing in frequency domain (CDM-F) or code division multiplexing in time domain (CDM-T). Also, DMRS ports differing from each to other in terms of $\Delta$ may be subjected together to CDM-F.

According to the present disclosure, CDM-F may be applied based on $w_f(k')$ in the following table, and CDM-T may be applied based on $w_t(l')$ in the following table. Herein, k' and l' are parameters for determining the subcarrier index to which the corresponding DMRS is mapped, and may be set to 0 or 1. Further, the DMRS corresponding to each DMRS port may be classified into CDM groups according to the DMRS configuration type as shown in the following table.

Table 12 below shows parameters for DMRS configuration type 1 for the PDSCH, and Table 13 shows parameters for DMRS configuration type 2 for the PDSCH.

TABLE 12

| p | $\lambda$ | CDM group $\Delta$ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 13

| p | $\lambda$ | CDM group $\Delta$ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |

TABLE 13-continued

| p | $\lambda$ | CDM group $\Delta$ | $w_f(k')$ k' = 0 | $w_f(k')$ k' = 1 | $w_t(l')$ l' = 0 | $w_t(l')$ l' = 1 |
|---|---|---|---|---|---|---|
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The UE may acquire, through DCI, DMRS port configuration information configured by a BS. As an example, the UE may acquire DMRS port configuration information through an antenna ports field of DCI format 1_1, based on the DMRS configuration type configured for the UE (e.g., DMRS configuration type 1 (dmrs-Type=1), DMRS configuration type 2 (dmrs-Type=2)), the maximum number of OFDM symbols for the DL front loaded DMRS (e.g., maxLength=1 or maxLength=2). More specifically, Table 14 shows DMRS port configuration information according to the value of the antenna ports field when (dmrs-Type=1 and maxLength=1) are set for the UE, and Table 15 shows DMRS port configuration information according to the value of the antenna ports field when (dmrs-Type=1 and maxLength=2) are set for the UE. Table 16 shows DMRS port configuration information according to the value of the antenna ports field when (dmrs-Type=2 and maxLength=1) are set for the UE, and Table 17 shows DMRS port configuration information according to the value of the antenna ports field when (dmrs-Type=2 and maxLength=2) are set for the UE.

TABLE 14

One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-19 | Reserved | Reserved |

TABLE 15

| | One Codeword: Codeword 0 enabled, Codeword 1 disabled | | | | Two Codewords: Codeword 0 enabled, Codeword 1 disabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 5 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 16

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |

TABLE 16-continued

| | One codeword:<br>Codeword 0 enabled,<br>Codeword 1 disabled | | Two codewords:<br>Codeword 0 enabled,<br>Codeword 1 enabled | | |
| --- | --- | --- | --- | --- | --- |
| Value | Number of DMRS CDM group(s) without data | DMRS port(s) | Value | Number of DMRS CDM group(s) without data | DMRS port(s) |
| 21 | 3 | 3-5 | | | |
| 22 | 3 | 0-3 | | | |
| 23 | 2 | 0, 2 | | | |
| 24-31 | Reserved | Reserved | | | |

TABLE 17

| | One Codeword:<br>Codeword 0 enabled,<br>Codeword 1 disabled | | | | Two Codewords:<br>Codeword 0 enabled,<br>Codeword 1 disabled | | |
| --- | --- | --- | --- | --- | --- | --- | --- |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 0 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-53 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 3 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |

TABLE 17-continued

| | One Codeword: Codeword 0 enabled, Codeword 1 disabled | | | | Two Codewords: Codeword 0 enabled, Codeword 1 disabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

In this case, the UE may perform DMRS reception according to conditions as follows.

In DMRS configuration type 1, when one codeword is scheduled for the UE, and DCI indicating one of 2, 9, 10, 11, or 30 as an index related to antenna port mapping (e.g., the index in Table 14 or Table 15) is allocated to the UE, or when two codewords are scheduled for the UE, the UE may receive the DMRS on the assumption that all the remaining orthogonal antenna ports are not related to PDSCH transmission to other UEs.

In DMRS configuration type 2, when one codeword is scheduled for the UE, and DCI indicating one of 2, 10, or 23 as an index related to antenna port mapping (e.g., the index in Table 15 or Table 16) is allocated to the UE, or when two codewords are scheduled for the UE, the UE may receive the DMRS on the assumption that all the remaining orthogonal antenna ports are not related to PDSCH transmission to other UEs.

4.8. Codeword

In the present disclosure, the BS may set the maximum number of codewords scheduled through one DCI for the UE through higher layer signaling. For example, the BS may set the maximum number of codewords scheduled through one DCI to 1 or 2 for the UE based on the higher layer parameter maxNrofCodeWordsScheduledByDCI (set to n1 or n2). In this case, the higher layer parameter maxNrofCodeWordsScheduledByDCI may be included in the higher layer parameter PDSCH-Config.

Referring to the Rel-15 TS 38.212 standard document, DCI format 1_1 may be configured according to the higher layer parameter maxNrofCodeWordsScheduledByDCI as shown in the table below.

TABLE 18

For transport block 1:
   - Modulation and coding scheme - 5 bits
   - New data indicator - 1 bit
   - Redundancy version - 2 bits
For transport block 2 (only present if maxNrofCodeWordsScheduledbyDCI equals 2):
   - Modulation and coding scheme - 5 bits
   - New data indicator - 1 bit
   - Redundancy version - 2 bits Accordingly, the NDI, MCS, and RV of CW #0 may be configured/indicate based on the NDI, MCS, and RV corresponding to transport block 1 in the DCI. Likewise, the NDI, MCS, and RV of CW #1 may be configured/indicate based on the NDI, MCS, and RV corresponding to transport block 2 in the DCI.

Additionally, when (i) a bandwidth part indicator field indicates a bandwidth part other than an active bandwidth part, (ii) the value of the higher layer parameter maxNrofCodeWordsScheduledByDCI for the indicated bandwidth part is 2, and (iii) the value of the higher layer parameter maxNrofCodeWordsScheduledByDCI for the active bandwidth part is 1, the UE may assume that the MCS, NDI, and RV fields of transport block 2 are padded with zero in interpreting the fields. Subsequently, in this case, the UE may ignore the MCS, NDI, and RV fields of transport block 2 for the indicated bandwidth part.

In addition, when the higher layer parameter maxNrofCodeWordsScheduledByDCI indicates that transmission of two codewords is enabled, one transport block (or codeword) between the two transport blocks (or codewords) may be enabled or disabled on the basis of the following method.

More specifically, when the higher layer parameter maxNrofCodeWordsScheduledByDCI indicates that transmission of two codewords is enabled, one of the two transport blocks may be disabled when (i) the MCS value is 26 (i.e., $I_{MCS}=26$), and (ii) the RV value is 1 (i.e., $rv_{id}=1$). When both transport blocks are enabled, transport block 1 and transport block 2 may be mapped to codeword 0 and codeword 1, respectively. When only one transport block is enabled, the enabled transport block may always be mapped to the first codeword (i.e., codeword 0).

4.9. Time/Frequency Resource Allocation Case Applicable to the Present Disclosure In the present disclosure, T/F resources for respective PDSCHs (e.g., PDSCH #0 and PDSCH #1) transmitted from different TRPs (transmission and reception points) (or beams or panels) may overlap with each other in various ways. Here, cases where the T/F resources overlap with each other may include all the five cases illustrated in FIG. 12.

Figure 12:
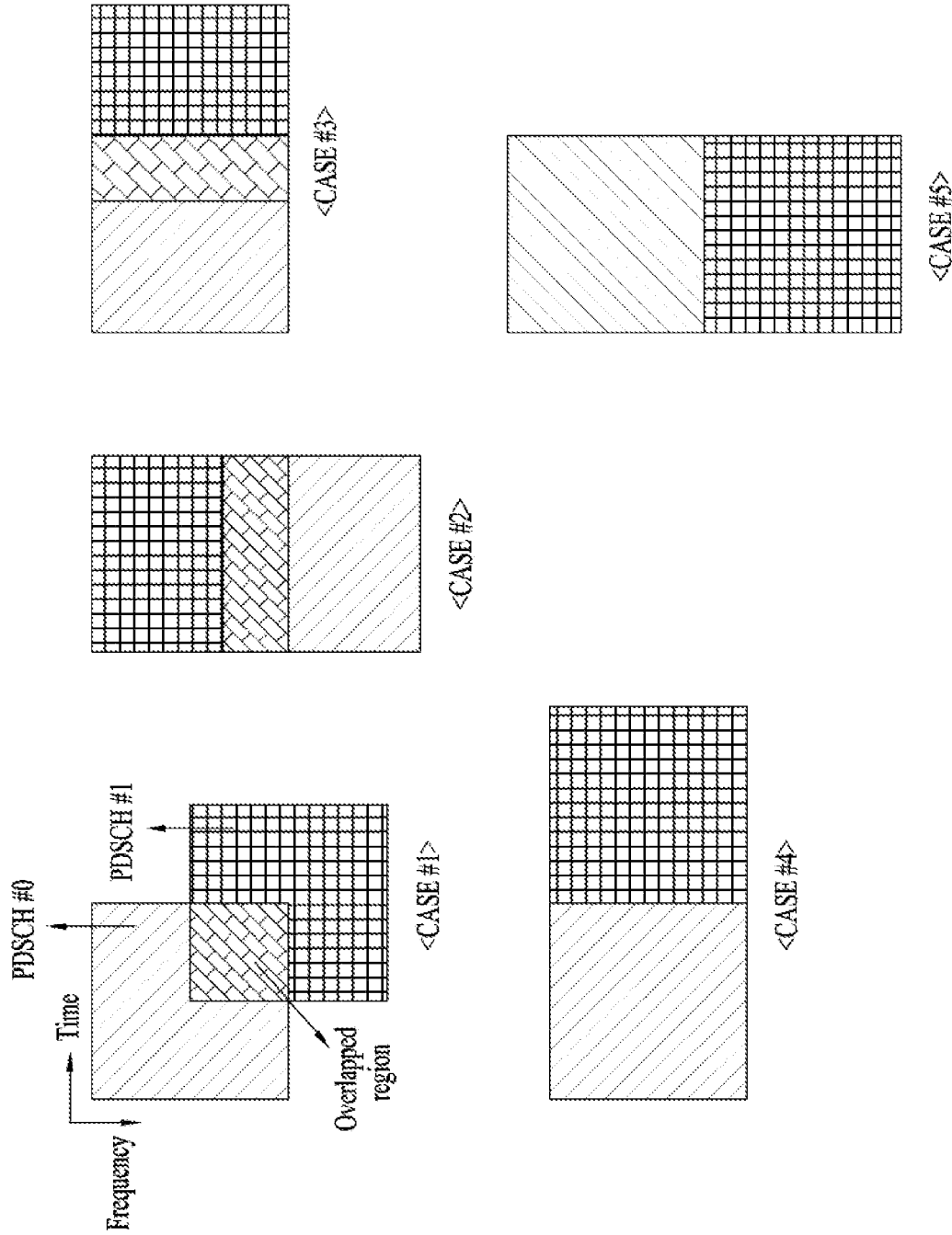
FIG. 12 is a diagram illustrating an example of a case where time and/or frequency resources of two PDSCHs applicable to the present disclosure overlap with each other.

FIG. 12 is a diagram illustrating an example of a case where time and/or frequency resources of two PDSCHs applicable to the present disclosure overlap with each other.

As shown in FIG. 12, the two PDSCHs may partially overlap with each other (e.g., cases #1 to #3) or may overlap with each other in one of the time domain or the frequency domain of the two PDSCHs (e.g.: cases #4 and #5). In cases #1/#2/#3 of FIG. 12, the two PDSCHs (partially) overlap with each other in both time and frequency. In case #4 of FIG. 12, the two PDSCHs do not overlap with each other only in the time axis. In case #5 of FIG. 12, the two PDSCHs overlap with each other along the time axis but not along the frequency axis.

4.10. Single PDCCH System

Figure 13:
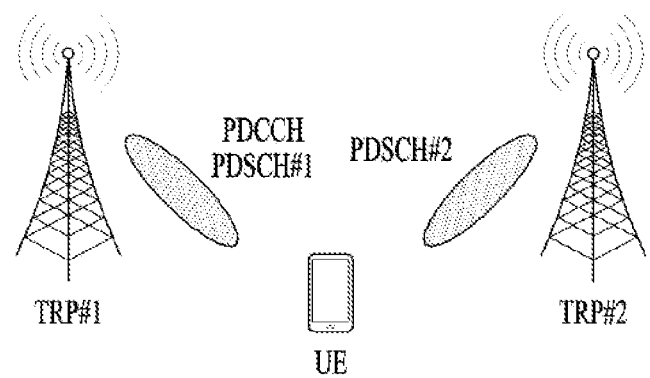
FIG. 13 is a diagram schematically illustrating the operation of a single PDCCH system applicable to the present disclosure.
Figure 15:
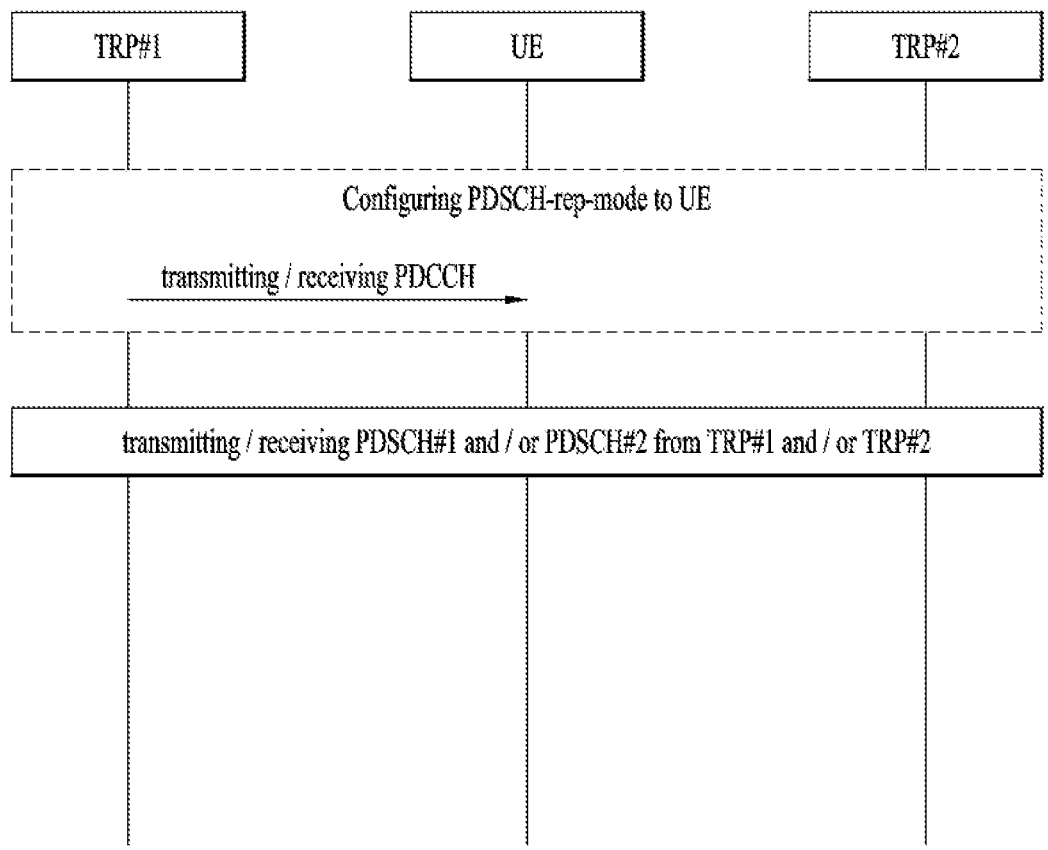
FIG. 15 is a diagram schematically illustrating an exemplary operation of a UE and a base station (e.g., an object including TRP #1 and TRP #2) applicable to the present disclosure.

FIG. 13 is a diagram schematically illustrating the operation of a single PDCCH system applicable to the present disclosure.

In FIG. 13, it is assumed that the two TRPs TRP #1/#2 transmit PDSCH #1/#2 to one UE, respectively. In the following description, as shown in FIG. 13, an operation in which a plurality of PDSCHs is scheduled by one PDCCH is referred to as a single PDCCH system or a single PDCCH operation. In other words, a single PDCCH may represent a PDCCH for scheduling a plurality of PDSCHs (for different TRPs).

For simplicity, in the following description, two TRPs are illustrated as an example of the plurality of TRPs. However, the same operation may be equally applied to an example of three or more TRPs according to an embodiment. In other words, in the present disclosure, a single PDCCH may include a PDCCH for scheduling PDSCHs for three or more TRPs.

According to the single PDCCH system, even when the UE receives the respective PDSCHs from different TRPs, the UE may acquire scheduling information about the plurality of PDSCHs by receiving one PDCCH. Accordingly, complexity of the PDCCH reception by the UE may be lowered.

In contrast, according to a multi-PDCCH system or multi-PDCCH operation in which two TRPs each transmit a PDCCH, and the PDCCHs schedules PDSCH #1/#2, respectively, the UE may receive the two PDSCHs only when successfully receiving the two PDCCH. On the other hand, in the single PDCCH system or single PDCCH operation, since the UE only needs to successfully receive one PDCCH to receive two PDSCHs, performance degradation caused by PDCCH miss-detection may be minimized.

In FIG. 13, the PDCCH for scheduling PDSCH #1/#2 may be transmitted from TRP #1 and/or TRP #2 to the UE.

4.11. Non-Coherent Joint Transmission (NC-JT)

In the present disclosure, a signal transmission method based on the case where time resources of PDSCHs transmitted by different TRPs (or beams) (partially) overlap with each other (Case #5 in FIG. 12) or time and frequency resources (partially) overlap with each other (e.g., CASEs #1, #2, and #3 in FIG. 12) is referred to as NC-JT.

In the present disclosure, single DCI based NC-JT may represent an NC-JT operation performed when PDSCHs transmitted from the different TRPs (or beams) are scheduled by one DCI. As an example, the single DCI-based NC-JT may include an NC-JT operation performed when PDSCHs #1/#2 are scheduled by DCI #1 simultaneously.

In the present disclosure, multi-DCI based NC-JT may represent an NC-JT operation performed when the PDSCHs transmitted from the different TRPs (or beams) are scheduled by corresponding DCIs, respectively. As an example, the multi-DCI-based NC-JT may include an NC-JT operation performed when PDSCHs #1/#2 are simultaneously scheduled by DCIs #1/#2, respectively.

In the present disclosure, NC-JT may be classified into two types according to whether the layers transmitted by different TRPs are independent or common.

In the present disclosure, stating that "layers are independent" may mean that when TRP #A transmits signals through 3 layers and TRP #B transmits signals through 4 layers, the UE expects signal reception through 7 layers in total.

On the other hand, in the present disclosure, stating that "layers are common" may mean that when TRP #A transmits signals through three layers and TRP #B transmits signals through three layers, the UE expects signal reception through three layers in total.

In the present disclosure, in order to distinguish the two aforementioned operations, NC-JT based on the former operation is referred to as "NC-JT with Independent Layer (IL)," and NC-JT based on the latter operation is referred to as "NC-JT with Common Layer (CL)."

In the present disclosure, various exemplary operations will be described based on the "NC-JT with IL" operation (or mode), but they may be applied even to exemplary operations based on the "NC-JT with CL" operation (or mode).

4.12. HARQ Process

DCI transmitted from the BS to the UE may contain a 'HARQ process number' field configured in 4 bits. Based on the HARQ process number indicated by the 'HARQ process number' field in the DCI, the UE may distinguish/recognize a PDSCH for which retransmission the PDSCH scheduled by the DCI is intended among the previously transmitted PDSCHs.

4.13. Determination of Modulation Order and Target Code Rate

In the present disclosure, a PDSCH may be scheduled by a PDCCH (e.g., DCI format 1_0 or DCI format 1_1) which is CRC (cyclic redundancy check)-scrambled by a cell-radio network temporary identifier (C-RNTI), a modulation coding scheme cell RNTI (MCS-C-RNTI), a temporary cell RNTI (TC-RNTI), a configured scheduling RNTI (CS-RNTI), a system information RNTI (SI-RNTI), a random access RNTI (RA-RNTI), or a paging RNTI (P-RNTI). Alternatively, the PDSCH may be scheduled based on a PDSCH configuration (SPS-config) provided from a higher layer without transmission of a corresponding PDCCH. The modulation order and target code rate for such PDSCHs may be determined/configured as follows.

(1) (i) When the higher layer parameter mcs-Table provided by the PDSCH-Config is set to 'qam256', and (ii) the PDSCH is scheduled by DCI format 1_1 CRC-scrambled by C-RNTI (or a PDCCH including DCI format 1_1 (or the If format 1_1), the UE may determine the modulation order $Q_m$ and the target code rate R for the PDSCH based on the MCS value (e.g., IMCS) and Table 20.

(2) Alternatively, when (i) the MCS-C-RNTI is not configured for the UE, (ii) the higher layer parameter mcs-Table provided by PDSCH-Config is set to 'qam64LowSE', and (iii) the PDSCH is scheduled by a PDCCH in a UE-specific search space CRC-scrambled by C-RNTI, the UE may determine the modulation order $Q_m$ and the target code rate R for the PDSCH based on the MCS value (e.g., IMCS) and Table 21.

(3) Alternatively, when (i) the MCS-C-RNTI is configured for the UE, and (ii) the PDSCH is scheduled by the PDCCH CRC-scrambled by the MCS-C-RNTI, the UE may determine the modulation order $Q_m$ and the target code rate R for the PDSCH based on the MCS value (e.g., IMCS) and Table 21.

(4) Alternatively, when (i) the higher layer parameter mcs-Table provided by the SPS-Config is not configured for the UE, and (ii) the higher layer parameter mcs-Table provided by PDSCH-Config is set to 'qam256', when the PDSCH is scheduled by DCI format 1_1 CRC-scrambled by CS-RNTI (or a PDCCH including the DCI format 1_1), or when the PDSCH is scheduled using SPS-config without transmission of a corresponding PDCCH, the UE may determine the modulation order $Q_m$ and the target code rate R for the PDSCH based on the MCS value (e.g., IMCS) and Table 20.

(5) Alternatively, when (i) the higher layer parameter mcs-Table provided by SPS-Config is set to 'qam64LowSE', when the PDSCH is scheduled by a PDCCH CRC-scrambled by CS-RNTI, or when the PDSCH is scheduled using SPS-config without transmission of a corresponding PDCCH, the UE may determine the modulation order $Q_m$ and the target code rate R for the PDSCH based on the MCS value (e.g., IMCS) and Table 21.

(6) Alternatively, the UE may determine the modulation order $Q_m$ and the target code rate R for the PDSCH based on the MCS value (e.g., IMCS) and Table 19.

TABLE 19

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |

TABLE 19-continued

| MCS Index $I_{MCS}$ | Modulation Order $Q_m$ | Target code Rate R x [1024] | Spectral efficiency |
|---|---|---|---|
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 20

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 21

| MCS index $I_{MCS}$ | Modulation Order $Q_m$ | Target code Rate R x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |

TABLE 21-continued

| MCS index $I_{MCS}$ | Modulation Order $Q_m$ | Target code Rate R x [1024] | Spectral efficiency |
|---|---|---|---|
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

4.14. Transport Block Size Determination

Based on section 5.1.3.2 in the standard specification 3GPP TS 38.214, the size of a transport block between the UE and the BS according to the present disclosure may be determined. More specifically, the transport block size may be determined as follows.

When the higher layer parameter maxNrofCodeWordsScheduledByDCI indicates that transmission of two codewords is enabled, if (i) the value of $I_{MCS}$ is 26 and (ii) the value of $rv_{id}$ is 1 for the corresponding transport block, the corresponding transport block may be disabled by DCI format 1_1. When both transport blocks are enabled, transport block 1 and transport block 2 may be mapped to codeword 0 and codeword 1, respectively. When only one transport block is enabled, the enabled transport block may always be mapped to the first codeword (e.g., codeword 0).

For the FDSCH allocated by DCI format 1_0 or DCI format 1_1 (or a PDCCH including the same) CRC-scrambled by C-RNTI, MCS-C-RNTI, TC-RNTI, CS-RNTI or SI-RNTI, when (i) Table 19 is used and $I_{MCS}$ is greater than or equal to 0 and less than or equal to 27, or (ii) Table 18 or Table 20 is used and $I_{MCS}$ is greater than or equal to 0 and less than or equal to 27, the UE may determine the transport block size (TBS) as follows, except for the case the transport block in DCI format 1_1 is disabled.

(1) The UE first determines the number of REs (e.g., $N_{RE}$) in the slot.

The UE first determines the number of REs (e.g., $N'_{RE}$) allocated for the PDSCH in the PRB, based on the following equation.

$$N'_{RE} = N_{sc}^{RB} \cdot N_{symb}^{sh} - N_{DMRS}^{PRB} - N_{oh}^{PRB} \quad \text{[Equation 1]}$$

In the equation above, $N_{sc}^{RB}=12$ denotes the number of subcarriers in a PRB, $N_{symb}^{sh}$ denotes the number of symbols included in the PDSCH allocation in the slot, $N_{DMRS}^{PRB}$ denotes the number of REs for DMRS for each PRB in a scheduled interval including the overhead of the DMRS CDM group without data, as indicated by DCI format 1_1 or determined according to characteristics of DCI format 1_0, and $N_{oh}^{PRB}$ denotes the overhead set by the higher layer parameter xOverhead in the higher layer parameter PDSCH-ServingCellConfig. When the higher layer parameter xOverhead is not configured in the higher layer parameter PDSCH-ServingCellConfig (the corresponding value may be set to 0, 6, 12 or 18), $N_{oh}^{PRB}$ is set to 0. When the PDSCH is scheduled by the PDCCH CRC-scrambled by SI-RNTI, RA-RNTI or P-RNTI, $N_{oh}^{PRB}$ may be assumed to be 0.

The UE may determine $N_{RE}$, the total number of REs allocated for the PDSCH, based on the following equation.

$$N_{RE} = \min(156, N'_{RE}) \cdot n_{PRB} \quad \text{[Equation 2]}$$

In the equation above, $n_{PRB}$ denotes the total number of PRBs allocated for the UE.

(2) $N_{info}$, the intermediate number of information bits may be acquired based on the following equation.

$$N_{info} = N_{RE} \cdot R \cdot Q_m \cdot \upsilon \quad \text{[Equation 3]}$$

In the equation above, R denotes a target code rate determined by the MCS field, $Q_m$ denotes a modulation order determined by the MCS field, and $\upsilon$ denotes the number of layers.

When the size of $N_{info}$ is less than or equal to 3824, step 3 may be used as a next step in determining the TBS. Conversely, when the size of $N_{info}$ is greater than 3824, step 4 may be used as a next step in determining the TBS.

(3) If the size of Ninth is 3824 or less, TBS may be determined as follows:

$N'_{info}$, which is a quantized intermediate number of information bits, may be set to satisfy the following equation.

$$N'_{info} = \max\left(24, 2^n \cdot \left\lfloor \frac{N_{info}}{2^n} \right\rfloor\right) \quad \text{[Equation 4]}$$

In the equation above, n may satisfy $n = \max(3, \lfloor \log_2(N_{info}) \rfloor - 6)$.

Based on the table below, the nearest TBS that is not less than $N'_{info}$ is found.

TABLE 22

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |

TABLE 22-continued

| Index | TBS |
|---|---|
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1738 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

(4) When the size of $N_{info}$ exceeds 3824, the TBS may be determined as follows:

$N'_{info}$, which is a quantized intermediate number of information bits, may be set to satisfy the following equation.

$$N'_{info} = \max\left(3840, 2^n \times \text{round}\left(\frac{N_{info} - 24}{2^n}\right)\right) \quad \text{[Equation 5]}$$

In the equation above, n may satisfy $n = \lfloor \log_2(N_{info} - 24) \rfloor - 5$.

When R is less than or equal to ¼, the TBS may be determined to satisfy the following equation.

$$TBS = 8 \cdot C \cdot \left\lceil \frac{N'_{info} + 24}{8 \cdot C} \right\rceil - 24 \quad \text{[Equation 6]}$$

In the equation above, C may be set to satisfy $$C = \left\lceil \frac{N'_{info} + 24}{3816} \right\rceil$$

Alternatively, when R is greater than ¼ and $N'_{info}$ is greater than 8424, the TBS may be determined to satisfy the following equation.

$$TBS = 8 \cdot C \cdot \left\lceil \frac{N'_{info} + 24}{8 \cdot C} \right\rceil - 24 \quad \text{[Equation 7]}$$

In the equation above, C may be set to satisfy $$C = \left\lceil \frac{N'_{info} + 24}{8424} \right\rceil.$$

Alternatively, the TBS may be determined to satisfy the following equation.

$$TBS = 8 \cdot \left\lceil \frac{N'_{info} + 24}{8} \right\rceil - 24 \quad \text{[Equation 8]}$$

Unlike the foregoing, when Table 19 is used, and $I_{MCS}$ is greater than or equal to 28 and less than or equal to 31, the TBS may be determined as follows.

More specifically, in the above case, it may be assumed that the TBS is determined from the DCI transmitted on the latest PDCCH for an identical transport block using $I_{MCS}$ having a value of 0 to 27. When (i) there is no identical transport blocks using $I_{MCS}$ having a value of 0 to 27, and (ii) the initial PDSCH for the identical transport block is semi-persistently scheduled, the TBS may be determined from the latest semi-persistent scheduling (SPS) allocation PDCCH.

Alternatively, it may be assumed that the TBS is determined from the DCI transmitted on the latest PDCCH for the identical transport block using using $I_{MCS}$ having a value of 0 to 28. When (i) there is no identical transport blocks using $I_{MCS}$ having a value of 0 to 28, and (ii) the initial PDSCH for the identical transport block is semi-persistently scheduled, the TBS may be determined from the latest SPS allocation PDCCH.

The UE may not expect that the PDSCH allocated by the PDCCH CRC-scrambled by SI-RNTI has a TBS exceeding the size of 2976 bits.

For the PDSCH allocated by DCI format 1_0 (or a PDCCH including the same) CRC-scrambled by P-RNTI or RA-RNTI, the TBS determination may follow steps 1 to 4 above with the following modification applied in step 2: In calculating $N_{info}$, scaling that satisfies the following equation is applied to $N_{info}$. Here, the scaling factor is determined based on the TB scaling field in DCI disclosed in the table below.

$$N_{info} = S \cdot N_{RE} \cdot R \cdot Q_m \cdot \upsilon \quad \text{[Equation 9]}$$

TABLE 23

| TB scaling field | Scaling factor S |
|---|---|
| 00 | 1 |
| 01 | 0.5 |
| 10 | 0.25 |
| 11 | |

In addition to the NDI and HARQ process ID signaled on the PDCCH, the TBS determined as described above may be reported to a higher layer (in the UE).

5. Examples of Operations of UE and BS Disclosed in this Document

5.0. Definition

In the present disclosure, terms used to describe the present disclosure may be defined as follows.

In the present disclosure, higher layer signaling may include radio resource control (RRC) signaling and/or a medium access control-control element (MAC-CE).

In the present disclosure, a transmission reception point (TRP) may be replaced with a beam.

As used herein, the term "PDSCH repetition" may include (i) transmitting, by a plurality of TRPs/beams, PDSCHs simultaneously at the same frequency resource in the same OFDM symbol(s), (ii) transmitting, by a plurality of TRPs/beams, PDSCHs simultaneously at some overlapping frequency resources in the same OFDM symbol(s), or (iii) transmitting, by a plurality of TRPs/beams, PDSCHs simultaneously at different frequency resources in the same OFDM symbol(s) (e.g., see Cases #2 and #5 in FIG. 12). Additionally, "PDSCH repetition" may further include (iv) transmitting, by a plurality of TRPs/beams, PDSCHs simultaneously in some overlapping OFDM symbols, or (v) alternately transmitting, by a plurality of TRPs/beams, PDSCHs in different OFDM symbols (e.g., see Cases #1, #3, and #4 in FIG. 12).

In the present disclosure, a precoding resource block group (PRG) may correspond to a resource block group (RBG) or an RB.

In the present disclosure, a plurality of codewords (CWs) generated from the same information sequence may be replaced with "a plurality of CWs generated from the same TB". In this case, CW #0 and CW #1 may correspond to the same TB. In this case, the DCI may include NDI, MCS, and RV distinguished by TB (e.g., TB #1, TB #2). In view of the above, based on the indexes CW #0 and CW #1, (i) the NDI, MCS, and RV of CW #0 in the DCI may represent NDI, MCS, and RV corresponding to transport block 1, and (ii) the NDI, MCS, and RV of CW #1 in the DCI may represent NDI, MCS, and RV corresponding to transport block 2.

In the present disclosure, as a method for a BS to indicate a plurality of TRPs/beams to a UE through DCI, the BS may use a TCI state including a plurality of RS sets (e.g., a TCI state including two RS sets may be used to indicate two TRPs/beams). In this case, the RS sets may a 1:1 correspondence relationship with TRPs/beams.

Alternatively, in the present disclosure, as a method for the BS to indicate a plurality of TRPs/beams to the UE through the DCI, the BS may allocate/configure a plurality of TCI states for the UE. Here, each TCI state may include one RS set. In this case, the TCI states may a 1:1 correspondence relationship with TRPs/beams.

Accordingly, in the following description, a method for the BS to indicate a plurality of TRPs/beams to the UE may represent not only (i) indicating, by the BS, a TCI state having two RS sets to the UE, (even if there is no specific mention) but also (ii) indicating, by the BS, two different TCI states each having one RS set to the UE.

In addition, the BS and the UE proposed in the present disclosure may not only perform each of the examples operations described below, but also perform an operation combining a plurality of example operation.

In the following description, each exemplary operation may be applied not only to the case of transmission of a downlink signal, but also a case of transmission of an uplink signal. In other words, in the following description, the PDSCH may be replaced by a PUSCH, a signal transmission subject, a TRP or a BS, may be replaced by a UE. A signal receiving subject, a UE, may be replaced by a TRP or a BS.

5.1. Method on Configuration of PDSCH Repetition from Multiple TRPs Based on Single PDCCH FIG. 14 is a diagram illustrating a configuration in which a UE receives PDSCH through two TRPs/beams.

In FIG. 14, when CWs transmitted by two TRPs are generated from the same information sequence, the UE may perform soft combining on the two CWs to greatly increase the reception success rate.

In FIG. 14, the two TRPs may transmit corresponding signals through the same T/F resource (e.g., overlapped PRGs), or may transmit corresponding signals through disjoint T/F resources (e.g.: disjoint PRGs).

The method using overlapped PRGs may be advantageous in terms of throughput since it makes maximum use of spatial multiplexing gain. However, since the UE is required to simultaneously receive the total sum of layers transmitted from two TRPs, the receiver complexity of the UE may increase. In addition, due to interference between different layers, reception performance of the UE may be degraded. Further, when channel state information (CSI) reporting is performed by the UE, the CSI reporting should additionally consider interference between different TRPs.

In the method using disjoint PRGs, PDSCHs transmitted by two TRPs are transmitted on different resources, and accordingly spatial multiplexing gain may be reduced. However, in this case, the receiver complexity of the UE may be reduced, and the reception performance of the UE may be improved.

In FIG. 14, one block may represent one PRG unit. In this case, the method using disjoint PRGs may include the following three methods as illustrated in FIG. 14.

Localized PRGs: Each of the two TRPs may transmit a PDSCH through (approximately) half the bandwidth that the BS indicates/allocates to the UE through DCI. According to the method, when the BS knows channel state information (CSI) between each TRP and the UE, the BS may control each TRP to transmit a PDSCH to the UE through an optimal resource, based on the information.

Interleaved PRGs: Each of the two TRPs may transmit a PDSCH by utilizing PRGs in an interleaved manner within the bandwidth indicated/allocated by the BS to the UE through DCI. According to the method, when the BS incorrectly knows or does not know CSI between each TRP and the UE, the BS may control the respective TRPs to be distributed as much as possible within a given bandwidth to transmit PDSCHs. Thereby, frequency diversity may be maximized.

TDMed PRGs: Two TRPs may transmit PDSCHs through different resources that are subjected to time division multiplexing (TDM). In this case, all the TRPs may transmit PDSCHs based on the same bandwidth.

Hereinafter, a configuration method for supporting a transmission mode in which CWs generated from the same information sequence are transmitted from a plurality of TRP/beam(s) as described above, and a method of operating a UE/BS based thereon will be described in detail.

5.1.1. Method on Configuration of PDSCH Repetition

5.1.1.1. First Method for Configuration of PDSCH Repetition Mode

The BS may configure a PDSCH repetition transmission mode (e.g., a mode in which CWs generated from the same information sequence are transmitted from a plurality of TRP/beam(s)) for the UE through higher layer signaling (e.g., RRC signaling or MAC-CE). For simplicity, the PDSCH repetition mode will be referred to as "PDSCH-rep-mode."

5.1.1.2. Second Method Configuration of PDSCH Repetition Mode

The UE may expect the PDSCH-rep-mode to be configured based on a determination that at least one of the following conditions is satisfied:

The BS transmits/indicates DCI including scrambled CRC to the UE based on the RNTI for the PDSCH-rep-mode;

The DCI transmitted/indicated by the BS to the UE (i) configures/indicates a TCI state including two RS sets, or (ii) configures/indicates two TCI states each including one RS set;

The BS configures the PDSCH-rep-mode in the UE through higher layer signaling

In the present description, the RNTI for the PDSCH-rep-mode may be newly defined or may represent another RNTI (e.g., MCS-C-RNTI) defined in an existing standard system. More specifically, the MCS-C-RNTI may be used for robust PDSCH transmission. Based on the MCS-C-RNTI, the UE may consider an MCS table designed to be relatively robust. Accordingly, when the MCS-C-RNTI defined in the existing standard system is used as the RNTI for the PDSCH-rep-mode, the BS operating in the PDSCH-rep-mode may perform robust PDSCH transmission to the UE.

As a specific example, when the BS indicates/configures a TCI state including two RS sets to the UE, the UE may expect that PDSCHs are transmitted by different TRPs/beams. As a result, when (i) the TCI state including two RS sets and (ii) the RNTI for the PDSCH-rep-mode (e.g., MCS-C-RNTI) are indicated/configured at the same time, the UE may expect that the PDSCH-rep-mode is configured.

As another specific example, when a TCI state including two RS sets is indicated/configured to the UE in which the PDSCH-rep-mode is configured through higher layer signaling (e.g., RRC signaling, etc.), the UE may expect that the PDSCH-rep-mode is configured.

5.1.2. Method on Enabling/Disabling PDSCH-Rep-Mode Dynamically

5.1.2.1. First Method for Enabling/Disabling PDSCH-Rep-Mode

Based on the determination that two CWs are enabled by the DCI received from the BS, the UE for which the PDSCH-rep-mode is configured may expect that the two CWs generated from the same information sequence are transmitted from different TRPs/beams. In this case, when the TCI state indicates/configures a plurality of RS sets, the UE may expect that the RS sets have a mapping relationship with the CWs in order.

As an example, it is assumed that TCI state={RS set #0, RS set #1} and CW #0 and CW #1 are indicated/configured to the UE for which the PDSCH-rep-mode is configured. In this case, the UE may expect that CW #0 is received through a beam indicated by RS set #0, and that CW #1 is received through a beam indicated by RS set #1. Here, the beam may be replaced with a resource.

5.1.2.2. Second Method for Enabling/Disabling PDSCH-Rep-Mode

Based on the determination that only one CW is enabled by the DCI received from the BS, the UE for which the PDSCH-rep-mode is configured may expect that only one TRP/beam transmits one CW. Alternatively, based on the determination that only one CW is enabled by the DCI received from the BS, the UE for which the PDSCH-rep-mode is configured may not expect that CWs generated from the same information sequence are transmitted from a plurality of TRPs/beams.

The method described above may be applied to a UE for which an operation mode (e.g., a general PDSCH transmission mode for, for example, a PDSCH scheduled by DCI scrambled with C-RNTI) other than the PDSCH-rep-mode is configured in the same manner.

5.1.3. Method on Configuring the Relationship Between Two CWs and Two RS Sets Dynamically Respectively

5.1.3.1. First Method for Configuring the Mapping Relationship

Based on a field (e.g., NDI, MCS, RV) for TB #2 (or transport block 2) in the received DCI, the UE for which the PDSCH-rep-mode is configured may determine/assume the mapping relationship between two CWs and two RS sets.

When the BS may dynamically indicate/configure the relationship between the two CWs and the two RS sets to the UE, a field for TB #2 (e.g., at least one field among NDI, MCS, and RV) may be used for other purposes (not for TB #2).

5.1.3.2. Second Method for Configuring the Mapping Relationship

Based on a specific disabled CW (e.g., CW #0 or CW #1), the UE for which the PDSCH-rep-mode is configured may expect that the PDSCH is received through one of the TRPs/beams corresponding to the two RS sets. In this case, the valid RS set may be determined based on (i) the enabled TB, (ii) a DCI field (e.g., NDI, MCS, RV) corresponding to the disabled TB, or (iii) a DCI field (e.g., NDI, MCS, RV) corresponding to TB #2 (or TB #1).

The configuration method described above may configure an RS set that is to transmit one valid CW in the method on enabling/disabling PDSCH-rep-mode dynamically in section 5.1.2 above. Additionally, the method may be applied in the same manner to a UE for which an operation mode (e.g., a general PDSCH transmission mode for, for example, a PDSCH scheduled by DCI scrambled with C-RNTI) other than the PDSCH-rep-mode is configured in the same manner.

As a specific example, it is assumed that the BS configures/indicates TCI state={RS set #0, RS set #1} to the UE. In this case, the UE may assume/expect that CW #0/#1 are received through the beams/TRPs indicated by RS set #0/#1, respectively.

Under the assumption above, when CW #1 is disabled (that is, the MCS field corresponding to CW #1 (or TB #2) has a value of 26, and the RV field has a value of 1), CW #0 may be transmitted through a beam indicated by RS set #0. On the other hand, CW #1 may not be transmitted through the beam indicated by RS set #1.

In contrast, when CW #0 is disabled, CW #1 may be transmitted through a beam indicated by RS set #1, and CW #0 may not be transmitted through the beam indicated by RS set #0.

As another specific example, it is assumed that the BS indicates/configures TCI state={RS set #0, RS set #1} to the UE, and CW #1 is disabled. In this case, when the NDI field corresponding to CW #1 (or TB #2) has a value of 0, CW #0 may be transmitted through a beam indicated by RS set #0. In this case, however, the UE may not expect that a DL signal may be transmitted in RS set #1.

On the other hand, when the NDI field has a value of 1, CW #0 may be transmitted through a beam indicated by RS set #1. In this case, however, the UE may not expect that a DL signal may be transmitted in RS set #0.

According to the examples given above, using a TCI state composed of two RS sets, the BS may indicate/configure that only a TRP/beam corresponding to a specific RS is to transmit the PDSCH as in dynamic point selection (DPS). For example, in TCI state #0={RS set #0}, TCI state #1={RS set #1}, and TCI state #2={RS set #0, RS set #1}, the BS may configure only TCI state #2 for the UE. Subsequently, the BS may implement TCI states #0 and #1 through the enable status of the CW (or TB) indicated/configured for the UE. Accordingly, the total number of TCI states that the BS may configure for the UE may be reduced.

However, according to the 5G system, when the rank of the beam indicated by one RS set is 5 or higher, two CWs should be transmitted through the one RS set. However, according to the examples, it may be difficult to configure/indicate the state for the UE in the above case. That is, in order to implement the above case, the entire TCI states that the BS may configure for the UE should include all of TCI state #0={RS set #0}, TCI state #1={RS set #1}, TCI state #2={RS set #0, RS set #1}.

5.1.3.3. Third Method for Configuring the Mapping Relationship

The UE for which the PDSCH-rep-mode is configured may expect that CW #0 (or TB #1) is always enabled, and CW #1 (or TB #2) is enabled or disabled.

When CW #1 is disabled, the UE may expect that the PDSCH is transmitted through only one of the TRPs/beams corresponding to the two RS sets. In this case, the RS set corresponding to the TRPs/beams through which the PDSCH (or CW #0 or TB #1) is transmitted may be determined based on a DCI field (e.g., NDI, MCS, RV) corresponding to CW #1 (or TB #2).

As a specific example, it is assumed that the BS indicates/configures TCI state={RS set #0, RS set #1} for the UE, and CW #1 is disabled. In this case, when the NDI field corresponding to CW #1 has a value of 0, CW #0 may be transmitted through a beam indicated by RS set #0. On the other hand, in the above case, the UE may not expect that a DL signal may be transmitted in RS set #1.

5.1.4. Method on Configuring Association Between RV of CW #0 and RV of CW #1

5.1.4.1. First Method for Configuring Association Between the RVs of Two CWs The UE for which the PDSCH-rep-mode is configured may determine the value of the RV of CW #1 based on (i) the RV of CW #0 and/or a higher layer configuration (e.g., RRC, MAC-CE). In this case, the RV values that CW #0 and CW #1 may have may be set to satisfy at least one of the conditions to be described later. As an example, the RV values that CW #0 and CW #1 may have may be set to one of a plurality of combinations to satisfy at least one condition to be described later. In this case, two combination groups may be configured, and each of the combination groups may be configured to satisfy Alt #1 and Alt #2.

Alt #1: Two CWs indicated/allocated by one DCI are mapped to a self-decodable RV (e.g., RV #0, RV #3) and a non-self-decodable RV (e.g., RV #1, RV #2). As an example, Alt #1 may correspond to a case where the RRC parameter is 0 in the embodiment described below.

Alt #2: Two CWs indicated/allocated by one DCI are both mapped to self-decodable RVs (e.g. RV #0, RV\#3) or non-self-decodable RVs (e.g., RV #1, RV #2). As an example, Alt #2 may correspond to a case where the RRC parameter is 1 in the embodiment described below.

One combination group may include both a specific RV combination and a combination having a completely exclusive relationship with the specific RV combination. For example, the specific combination group may include both {CW #0 with RV #0, CW #1 with RV #2} and {CW #0 with RV #3, CW #1 with RV #1}.

One combination group may include both a specific combination and a combination having a symmetric relationship with the specific combination. For example, the specific combination group may include both {CW #0 with RV #0, CW #1 with RV #2} and {CW #0 with RV #2, CW #1 with RV #0}.

As described above, CW #1 may be generated from the same information sequence as CW #0. Accordingly, the RV value of CW #1 may be determined based on the RV value of CW #0.

When two CWs are configured for a specific UE, the DCI field provided by the BS to the specific UE may include DCI fields for two TBs (e.g., TB #1/TB #2) as shown in the table below. In this case, when the two CWs are generated from the same information sequence, an NDI field for the second CW (or TB #2) may be unnecessary. In addition, as described above, when the RV for the second CW (or TB #2) is determined based on the RV for the first CW (or TB #1), an RV field for the second CW (or TB #2) may be unnecessary.

TABLE 24

For transport block 1:
   Modulation and coding scheme-5 bits
   New data indicator-1 bit
   Redundancy version-2 bits
For transport block 2 (only present if
maxNrofCodeWordsScheduledByDCI equals 2):
   Modulation and coding scheme-5 bits
   New data indicator-1 bit
   Redundancy version-2 bits In this case, according to the present disclosure, the BS and the UE may operate according to various embodiments as follows. In this case, various embodiments of the BS and the UE may be implemented based on Table 25 below.

TABLE 25

| RRC parameter | {CW#0, CW#1} | {CW#0, CW#1} | {CW#0, CW#1} | {CW#0, CW#1} |
|---|---|---|---|---|
| 0 | {RV#0, RV#2} | {RV#3, RV#1} | {RV#2, RV#0} | {RV#1, RV#3} |
| 1 | {RV#0, RV#3} | {RV#2, RV#1} | {RV#3, RV#0} | {RV#1, RV#2} |

For example, in Table 25, when the value of the RRC parameter is 0 and the RV value of CW #0 is 0, the RV value of CW #1 may be determined to be 2. As such, RV #0 and RV #2 generally have RV values with very low association between the two CWs. In this case, the receiver may obtain a larger coding gain.

Subsequently, when the RV value of CW #0 is set to 3 for retransmission of a specific signal, the RV value of CW #1 may be determined to be 1. In this case, the UE may receive all of RV #0, RV #1, RV #2, and RV #3 corresponding to a specific information sequence from the BS through one retransmission. Accordingly, the receiver of the UE may obtain the largest coding gain.

As another example, in Table 25, it may be seen that the fourth column is symmetrical with the second column. For detailed description, it is assumed that when the value of the RRC parameter is set to 0, the UE successfully receives CW #1 with RV #2, but does not receive CW #0 with RV #0. In this case, most of the systematic codes are missing, and thus there is a high possibility that the UE fails to decode the received signal.

However, when the corresponding signal is retransmitted and CW #1 with RV #0 is indicated for this purpose, a signal corresponding to RV #0 may be received from a different TRP than before. In this case, as long as blockage does not occur simultaneously between the two TRPs and the UE within a predetermined time, reception of a self-decodable CW may be guaranteed with one retransmission.

As a result, spatial/beam diversity may be provided for a self-decodable code. Even when the value of the RRC parameter is set to 1, spatial/beam diversity may be provided for the same self-decodable code (e.g., {CW #0 with RV #0, CW #1 with RV #3} & {CW #0 with RV #3, CW #1 with RV #0})

As another example, in Table 25, when the value of the RRC parameter is 1 and the RV value of CW #0 is 0, the RV value of CW #1 may be determined to be 3. Since RV #0 and RV #3 almost share a systematic code technically, performance may be degraded in terms of coding gain. However, even when only one CW is received by the UE, it is self-decodable. Therefore, if blockage does not occur between the two TRPs and the UE, the UE may receive a self-decodable CW in any case.

When a specific signal is retransmitted and the RV of CW #0 is set to 2 therefor, the RV value of CW #1 may be determined to be 1. According to this operation, the UE may obtain all of RV #0, RV #1, RV #2, and RV #3 of the specific signal (or information sequence) through one retransmission, and thus may obtain the largest coding gain.

According to the above-described method, the BS does not need to separately define the RV bit (or field) of CW #1 in DCI. As a result, the BS may reduce the bit size signaled in the DCI or use the bit field for other purposes.

Additionally, unlike the above-described example, the BS may indicate/configure one of the rows of the following table through the RRC parameter and/or the DCI field. As an example, when the BS indicates/configures one of the rows of the following table through the DCI field, the BS may indicate/configure the one row (e.g., indicating/setting 0 or 1) through one or more of an NDI field for the second TB defined in the DCI, and/or an RV field for the second TB, and/or an MCS field for the second TB to the UE.

In addition, as in the above-described example, the RV value of CW #1 may be determined based on the RRC parameter and the RV value of CW #0, or a pairing index may be indicated/set based on the DCI and/or RRC as shown in Table 26 below. In the present disclosure, the pairing index may represent an index indicating a configuration in which {RV value for CW #0, RV value for CW #1} are paired with each other.

In the case of the table below, 2 bits in the DCI and 1 bit in the RRC signaling may be required. For example, for 2-bit information in the DCI, an RV field for CW #0 (or CW #1) may be used.

TABLE 26

| RRC parameter | DCI field | | | |
|---|---|---|---|---|
| | 00 {CW#0, CW#1} | 01 {CW#0, CW#1} | 10 {CW#0, CW#1} | 11 {CW#0, CW#1} |
| 0 | {RV#0, RV#2} | {RV#3, RV#1} | {RV#2, RV#0} | {RV#1, RV#3} |
| 1 | {RV#0, RV#3} | {RV#2, RV#1} | {RV#3, RV#0} | {RV#1, RV#2} |

5.1.4.2. Second Method for Configuring Association Between the RVs of Two CWs The UE for which the PDSCH-rep-mode is configured may not expect that the RV field (or RV value) of CW #1 (or TB #2) is indicated/configured. In other words, for the UE for which the PDSCH-rep-mode is configured, the BS may not separately indicate/configure the RV field (or RV value) of CW #1 (or TB #2). However, the UE may expect that the starting point of CW #1 corresponds to a point in time that follows immediately at the end of CW #0.

In the PDSCH-rep-mode, it may be interpreted that two codewords are configured/indicated from the perspective of signaling. However, since the two codewords are substantially generated from the same information sequence, they may be interpreted as one codeword depending on the situation. As an example, when CW #0 is a self-decodable codeword (e.g., RV #0 or RV #3), CW #1 may simply contain only redundant bits. In this case, the codewords may be decoded from the perspective of the UE because the two codewords are generated from the same information sequence. In this case, when CW #1 is composed of coded bits starting immediately after the end of CW #0, the UE may maximize the coding gain. In this case, the BS does not need to separately define the RV for CW #1, and therefore signaling overhead may be reduced.

FIG. 14 is a diagram schematically illustrating an example of operation of a UE and a BS (e.g., an object including TRP #1 and TRP #2) applicable to the present disclosure.

First, the UE may be configured with a PDSCH-rep-mode by the BS. As described above in section 5.1.1, the configuration may be established through one or more of the following methods.

1) Establishing the configuration through higher layer signaling (e.g., RRC and/or MAC-CE, etc.) of the BS; and
2) (i) DCI including CRC scrambled with RNTI for PDSCH-rep-mode is indicated to the UE, and/or (ii) the BS indicates a TCI state (or two TCI states) having the DCI including two RS sets to the UE, and/or (iii) the PDSCH-rep-mode is configured for the UE by higher layer signaling.

In other words, when the PDSCH-rep-mode is configured based on method 1) between the above-described methods, the UE may additionally receive a PDCCH for scheduling PDSCH #1 and/or PDSCH #2 from TRP #1 or TRP #2.

Alternatively, when the PDSCH-rep-mode is to be configured based on method 2) between the above-described methods, the PDSCH-rep-mode may be configured for the UE based on the determination that (i) the DCI included in a PDCCH for scheduling PDSCH #1 and/or PDSCH #2 received from TRP #1 or TRP #2 includes a CRC scrambled with an RNTI for the PDSCH-rep-mode, and/or (ii) a TCI state (or two TCI states) including two RS sets is indicated.

In addition, based on at least one of the methods according to sections 5.1.2 to 5.1.4 above, the UE may receive PDSCH #1 (or CW #0 or TB #1) and/or PDSCH #2 (or CW #1 or TB #2) transmitted from TRP #1 and/or TRP #2.

More specifically, the methods disclosed in sections 5.1.2 to 5.1.4 above may be applied.

In the present disclosure, the operation in which two different TRPs transmit CWs generated from the same information sequence to the UE may correspond to an operation for an ultra-reliable low latency communication (URLLC) system. In other words, for the URLLC service, the BS may transmit TBs (or CWs or PDSCHs) having the same information to one UE through different TRPs. Conversely, the operation in which two different TRPs transmit CWs generated from different information sequences to the UE may correspond to an operation for an enhanced mobile broadband (eMBB) system.

Based on this, the BS may signal whether the URLLC service (information of signals transmitted from two TRPs is the same) or the eMBB service (information of signals transmitted from two TRPs is different) is supported to the UE according to the above-described methods. As a specific method, RRC signaling, RNTI, or the like may be used.

When the BS supports the eMBB service, each TB field in the DCI transmitted by the BS for scheduling may provide TB information (e.g., MCS, code rate, RV, etc.) for a signal transmitted from each TRP as in conventional cases.

On the other hand, when the BS supports the URLLC service, the UE may interpret the two TB fields in the DCI differently according to various methods according to the present disclosure. As an example, the UE may acquire only code rate information from some bit information of the second TB field.

In addition, as described above, RV information for each signal may be explicitly signaled as in the example described in the present disclosure or may be determined based on an implicit rule.

In the present disclosure, schemes for multi-TRP based URLLC scheduled by single DCI at least may include the following schemes.

(1) Scheme 1 (SDM)

n (n<=Ns) TCI states within the single slot may be configured with overlapped time and frequency resource allocation.

(1-1) Scheme 1a

Each transmission occasion may be a layer or a set of layers of the same TB. Here, each layer or layer set may be related to one TCI and one set of DMRS port(s).

A single codeword with one RV may be used across all spatial layers or layer sets. From the UE perspective, different coded bits may be mapped to different layers or layer sets with the same mapping rule as in Rel-15.

(1-2) Scheme 1b

Each transmission occasion may be a layer or a set of layers of the same TB. Here, each layer or layer set may be related to one TCI and one set of DMRS port(s).

A single codeword with one RV may be used for each spatial layer or layer set. The RVs corresponding to each spatial layer or layer set may be the same or different.

Codeword-to-layer mapping may be applied when the total number of layers is less than or equal to 4.

(1-3) Scheme 1c

One transmission opportunity may be (i) one layer of the same TB with one DMRS port related to multiple TCI state indices, or (ii) one layer of the same TB with multiple DMRS ports related to multiple TCI state indices one by one.

For Scheme 1, applying different MCS/modulation orders for different layers or layer sets may be discussed.

(2) Scheme 2 (FDM)

Here, n (n<=$N_f$) TCI states within one slot may be configured with non-overlapped frequency resource allocation.

For Scheme 2, each non-overlapped frequency resource allocation may be related to one TCI state.

For Scheme 2, the same single/multiple DMRS port(s) may be related to all non-overlapped frequency resource allocations.

(2-1) Scheme 2a

A single codeword with one RV may be used across full resource allocation. From the UE perspective, common RB mapping (e.g., codeword to layer mapping as in Rel-15) may be applied across full resource allocation.

(2-2) Scheme 2b

A single codeword with one RV may be used for each non-overlapped frequency resource allocation. The RVs corresponding to each non-overlapped frequency resource allocation may be the same or different.

For Scheme 2, applying different MCS/modulation orders for different non-overlapped frequency resource allocations may be discussed.

As an example, in single DCI-based multiple TRP (e.g., M-TRP) URLLC, for RV sequences applied to RBs sequentially related to two TCI states, $RV_{id}$ indicated by the DCI may be used to select one of 4 RV sequence candidates.

As another example, in single DCI-based multiple TRP (e.g., M-TRP) URLLC, the following RV sequence candidates may be supported: (0, 2), (2, 3), (3, 1), (1, 0).

(3) Scheme 3 (TDM)

Here, n (n<=$N_{t1}$) TCI states within the single slot may be configured with non-overlapped time resource allocation.

For Scheme 3, each transmission occasion of the TB may have (i) one TCI and (ii) one RV with the time granularity of mini-slot.

For Scheme 3, all transmission occasion(s) within the slot may use a common MCS with same single or multiple DMRS port(s).

As an example, in the single DCI-based multiple TRP (e.g., M-TRP) URLLC, for RV sequences applied to transmission occasions sequentially related to two TCI states, $RV_{id}$ indicated by the DCI may be used to select one of 4 RV sequence candidates.

As another example, in the single DCI-based multiple TRP (e.g., M-TRP) URLLC, the following RV sequence candidates may be supported: (0, 2), (2, 3), (3, 1), (1, 0).

The RV/TCI state may be the same or different among transmission occasions.

For Scheme 3, channel estimation interpolation may be applied across mini-slots with the same TCI index.

(4) Scheme 4 (TDM)

Here, n (n<=$N_{t2}$) TCI states may be configured with K (n<=K) different slots.

For Scheme 4, each transmission occasion of the TB may have one TCI and one RV (Each transmission occasion of the TB has one TCI and one RV).

For Scheme 4, all transmission occasion(s) across K slots may use a common MCS with the same single or multiple DMRS port(s).

The RV/TCI state may be the same or different among transmission occasions.

For Scheme 4, channel estimation interpolation may be applied across slots with the same TCI index.

In the present disclosure, M-TRP/panel based URLLC schemes may be compared in terms of i(i) improved reliability, (ii) efficiency, and (iv) specification impact.

Support of the number of layers per TRP may be discussed later.

In the disclosures above, $N_s$, $N_f$, $N_{t1}$, and $N_{t2}$ have values set by the BS, respectively, and may be determined/set based on higher layer signaling and/or DCI.

Based on the disclosures above, multi-TRP based URLLC scheduled by single DCI may support the following details.

As an example, the multi-TRP-based URLLC scheduled by single DCI may support an operation according to Scheme 1a.

As another example, the multi-TRP-based URLLC scheduled by single DCI may support at least one of Scheme 2a and Scheme 2b. To this end, simulation results of a system level simulator (SLS) and a link level simulator (LLS) may be considered.

Figure 16:
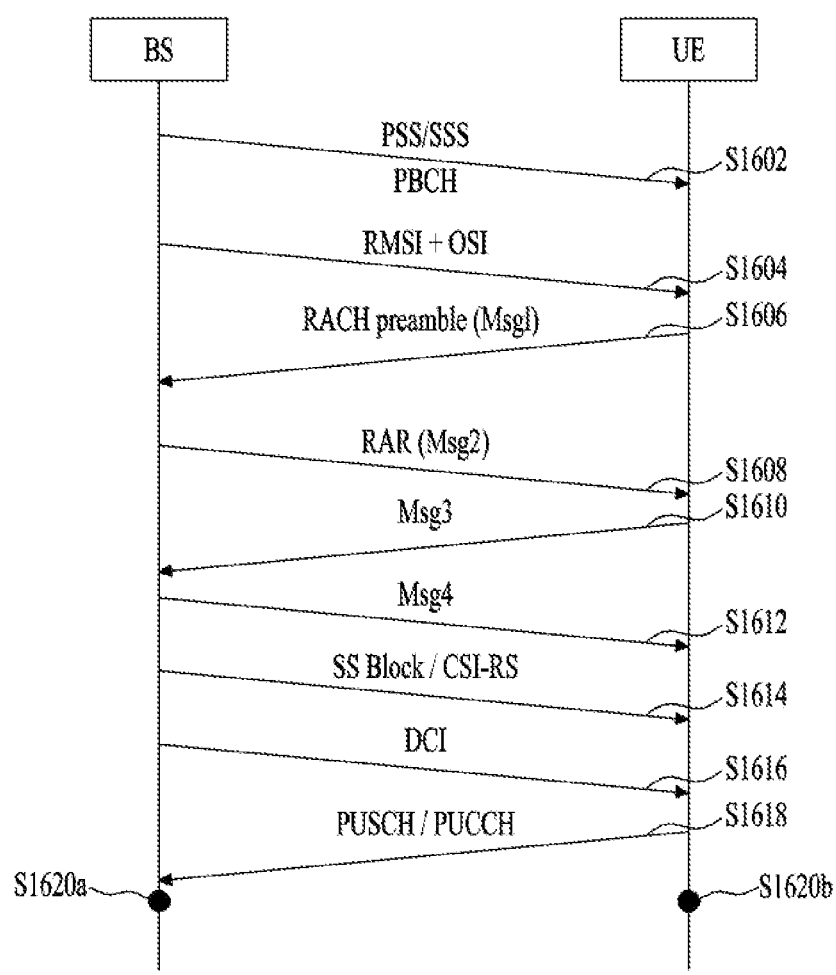
FIG. 16 is a diagram schematically illustrating network connection and communication between a UE and a base station applicable to the present disclosure.

FIG. 16 is a diagram schematically illustrating network connection and communication between a UE and a BS applicable to the present disclosure.

The UE may perform a network access procedure to perform the procedures and/or methods described/proposed above. For example, while accessing a network (e.g., a BS), the UE may receive system information and configuration information required to perform the procedures and/or methods described/proposed above and store the same in a memory. The configuration information required for the present disclosure may be received through higher layer (e.g., RRC layer; medium access control (MAC) layer, etc.) signaling.

In the NR system, a physical channel and a reference signal may be transmitted using beamforming. When beamforming-based signal transmission is supported, a beam management procedure may be involved to align beams between the BS and the UE. In addition, the signal proposed in the present disclosure may be transmitted/received using beamforming. In the radio resource control (RRC) IDLE mode, beam alignment may be performed based on a sync signal block (SSB). On the other hand, in the RRC CONNECTED mode, beam alignment may be performed based on CSI-RS (in DL) and SRS (in UL). When beamforming-based signal transmission is not supported, a beam related operation may be omitted in the following description.

Referring to FIG. 16, a base station (e.g., BS) may periodically transmit an SSB (S1602). Here, the SSB includes a PSS/SSS/PBCH. The SSB may be transmitted using beam sweeping. Thereafter, the BS may transmit remaining minimum system information (RMSI) and other system information (OSI) (S1604). The RMSI may include information (e.g., PRACH configuration information) necessary for the UE to initially access the BS. After performing SSB detection, the UE identifies the best SSB. Thereafter, the UE may transmit a RACH preamble (Message 1 (Msg1)) to the BS using a PRACH resource linked/corresponding to the index (i.e., the beam) of the best SSB (S1606). The beam direction of the RACH preamble is related to the PRACH resource. The association between the PRACH resource (and/or the RACH preamble) and the SSB (index) may be configured through system information (e.g., RMSI). Thereafter, as part of the RACH procedure, the BS may transmit a random access response (RAR) (Msg2) in response to the RACH preamble (S1608), and the UE may transmit Msg3 (e.g., an RRC connection request) using the UL grant in the RAR (S1610). Then, the BS may transmit a contention resolution message (Msg4) (S1612). Msg4 may include RRC Connection Setup.

When the RRC connection is established between the BS and the UE through the RACH procedure, subsequent beam alignment may be performed based on SSB/CSI-RS (in DL) and SRS (in UL). For example, the UE may receive an SSB/CSI-RS (S1614). The SSB/CSI-RS may be used for the UE to generate a beam/CSI report. The BS may make a request for the beam/CSI report to the UE through DCI (S1616). In this case, the UE may generate the beam/CSI report based on the SSB/CSI-RS, and transmit the generated beam/CSI report to the BS through PUSCH/PUCCH (S1618). The beam/CSI report may include a beam measurement result and information on a preferred beam. The BS and the UE may perform beam switch based on the beam/CSI report (S1620a and S1620b).

Thereafter, the UE and the BS may perform the procedures and/or methods described/proposed above. For example, based on the configuration information obtained in the network access procedure (e.g., the system information acquisition procedure, the RRC connection process procedure through RACH, etc.), the UE and the BS may process the information in the memory or process the received radio signal and store the same in a memory, according to the proposal in the present disclosure. Here, the radio signal may include at least one of a PDCCH, a PDSCH, or a reference signal (RS) in case of downlink, and may include at least one of a PUCCH, a PUSCH, or an SRS in case of uplink.

Figure 17:
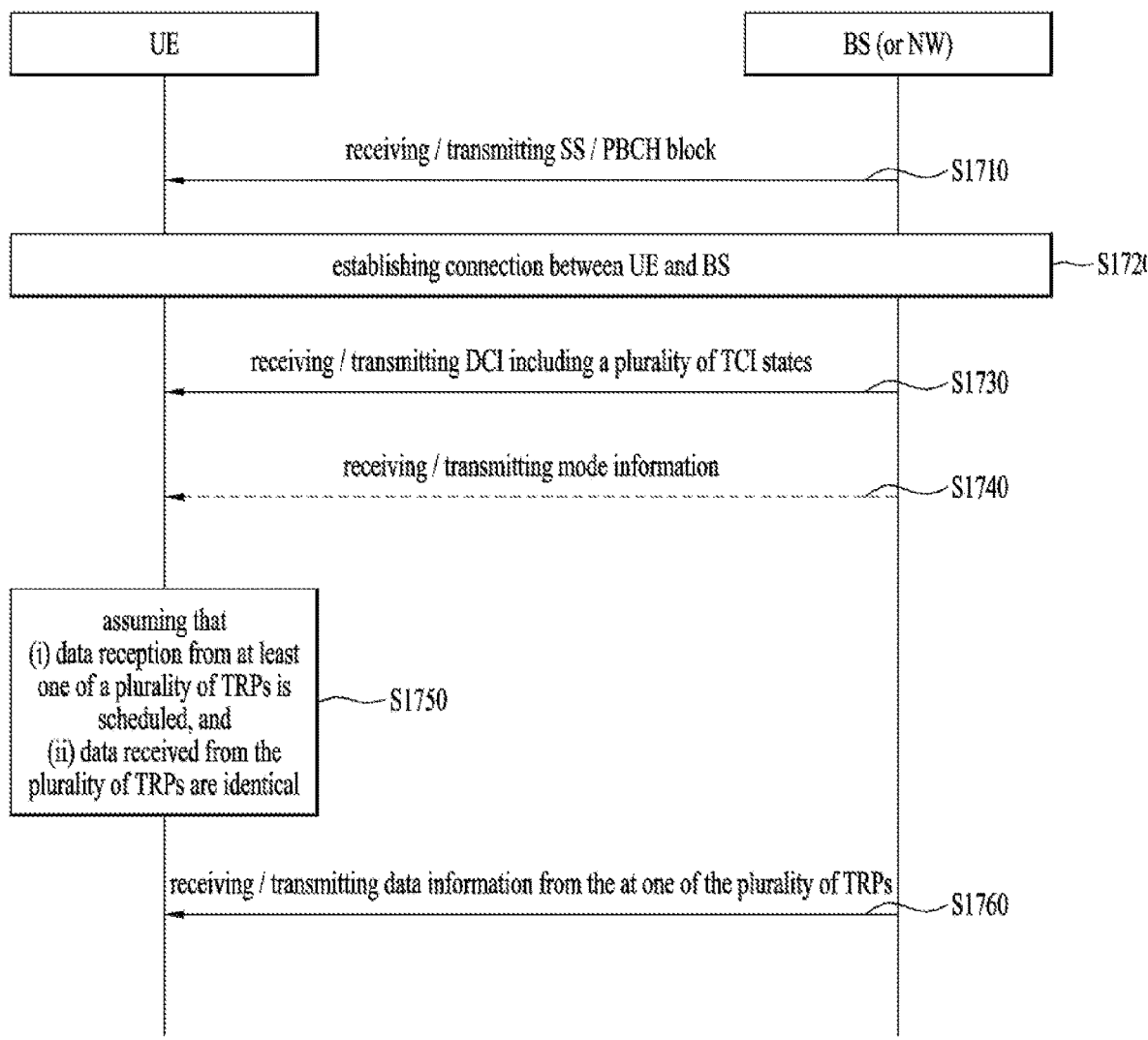
FIG. 17 is a diagram schematically illustrating the operation of a UE and a base station according to an example of the present disclosure.
Figure 18:
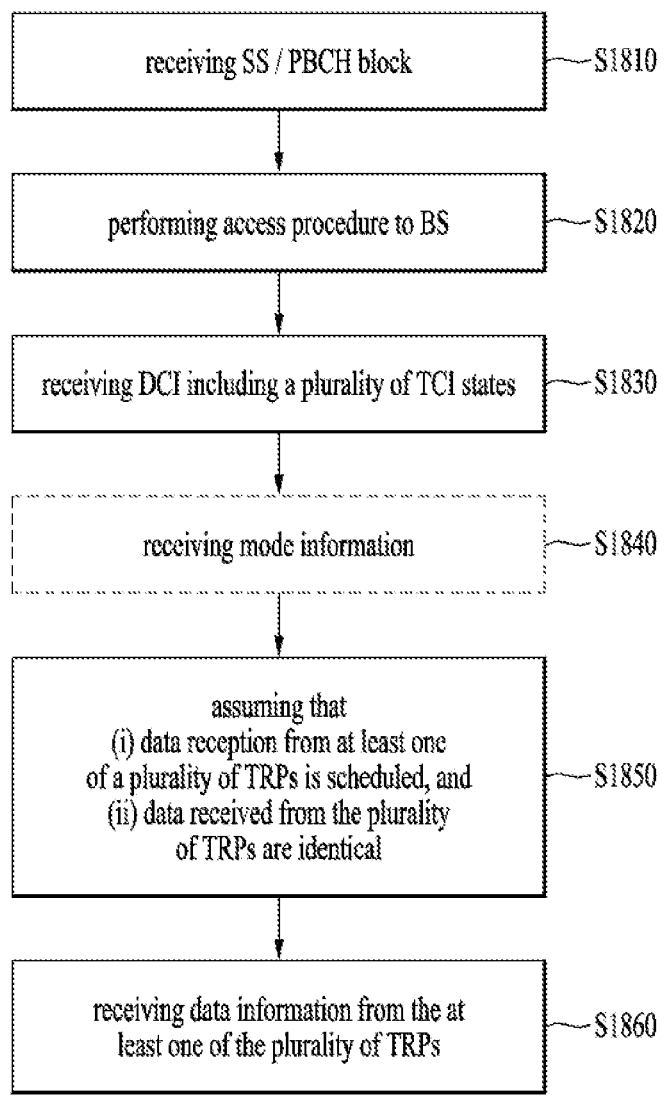
FIG. 18 is a flowchart of an operation of the UE according to an example of the present disclosure.
Figure 19:
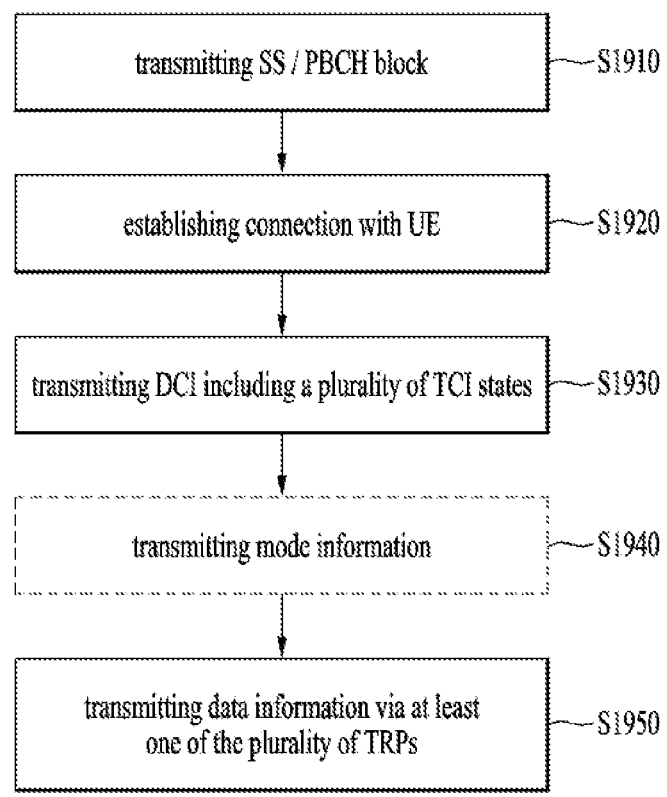
FIG. 19 is a flowchart of an operation of the base station according to an example of the present disclosure.
Figure 20:
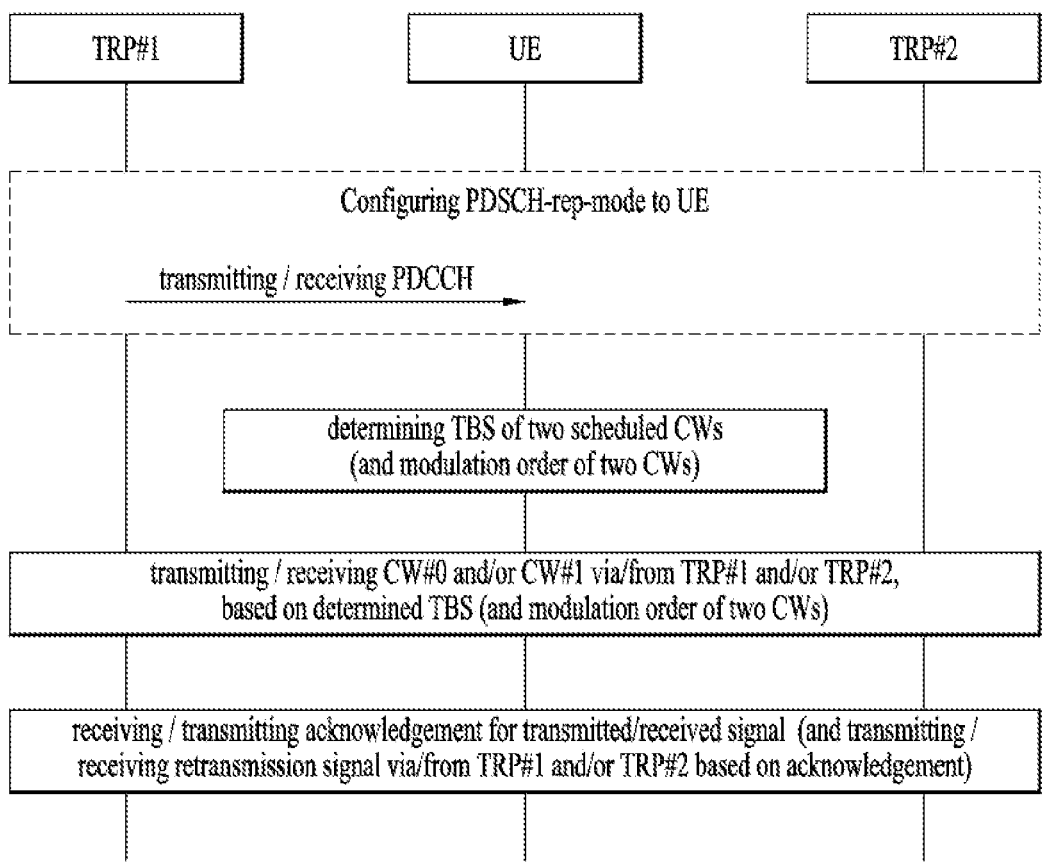
FIG. 20 is a diagram schematically illustrating an exemplary operation of a UE and a base station (e.g., an object including TRP #1 and TRP #2) applicable to the present disclosure.

FIG. 17 is a diagram schematically illustrating the operation of a UE and a base station according to an example of the present disclosure, FIG. 18 is a flowchart of an operation of the UE according to an example of the present disclosure, and FIG. 19 is a flowchart of an operation of the base station according to an example of the present disclosure.

In an example applicable to the present disclosure, the UE may receive a synch signal/physical broadcast channel (SS/PBCH) block including an SS and a PBCH from the BS (S1710 and S1810). In a corresponding operation, the BS may transmit the SS/PBCH block to the UE (S1710 and S1910).

Based on the received SS/PBCH block, the UE may perform a procedure of access to the BS including transmission of a random access channel (RACH) preamble (S1720 and S1820). In response, the BS may establish a connection with the UE (S1720 and S1920).

In addition, the UE and the BS between which the connection is established based on the above-described procedure may operate as follows.

Specifically, the UE may receive, from the BS, downlink control information (DCI) including a plurality of transmission configuration indicator (TCI) states (S1730 and S1830). In a corresponding operation, the BS may transmit the DCI to the UE (S1730 and S1930).

In the present disclosure, the DCI may include information for two transmission blocks (TBs) corresponding to two codewords, respectively. For example, the DCI may include information shown in Table 22.

In the present disclosure, each of the plurality of TCI states may be related to one reference signal (RS) set.

The UE may acquire, from the BS, mode information related to a first mode in which a plurality of data based on the same information is transmitted.

As an example applicable to the present disclosure, the first mode may include a multi-TRP-based URLLLC (ultra-reliable low latency communication) mode. As another example, the mode information may be related to one of the first mode or a second mode including a multi-TRP-based eMBB (enhanced mobile broadband) mode.

As an example applicable to the present disclosure, the UE may receive the mode information through higher layer signaling including RRC signaling (S1740 and S1840). In a corresponding operation, the BS may transmit the mode information to the UE through higher layer signaling (S1740 and S1940). In this case, the transmission and reception of the mode information may be performed before or after the transmission and reception of the above-described DCI in the time domain.

Alternatively, as another example applicable to the present disclosure, the UE may acquire the information based on DCI including a cyclic redundancy check (CRC) scrambled with a radio network temporary identifier (RNTI) related to the first mode. In other words, the UE may acquire the mode information related to the first mode without additional signaling. Hereinafter, for simplicity, it is assumed that the BS configures the mode information to the UE through separate signaling. However, embodiments may not be limited thereto as described above.

Based on the DCI and the mode information, the UE may assume that (i) data reception scheduled from at least one transmission reception point (TRP) among a plurality of TRPs related to the DCI, and (ii) data received from the plurality of TRPs is based on the same information (S1750 and S1850).

Subsequently, based on the assumption, the UE may acquire data information from at least one of the plurality of TRPs (S1760 and S1860). In a corresponding operation, the BS may transmit the data information through at least one of the plurality of TRPs related to the DCI based on the DCI and the mode information (S1760 and S1850).

As a specific example, based on (i) the DCI indicating that two codewords are enabled and (ii) the assumption, the UE may acquire the data information through to each PDSCH occasion related to the two TRPs among the plurality of TRPs. In the present disclosure, a PDSCH occasion may represent a PDSCH (or PDSCH candidate) related to the same information (e.g., the same TB) related to a plurality of TCI states (e.g., two TCI states).

As an example, the redundancy version (RV) information for the two PDSCH occasions may be determined based on either an assumption that an RV combination for the two PDSCH occasions is determined based on RV information related to the first codeword included in the DCI or an assumption that RV information related to the second codeword is determined based on RV information related to the first codeword in the RV information for the two PDSCH occasions.

As another example, the RV information for the two PDSCH occasions may be configured/indicated as one of {RV #0, RV #2}, {RV #1, RV #3}, {RV #2, RV #0}, {RV #3, RV #1}.

As another specific example, based on the DCI indicating that one of the two codewords is enabled and the assumption, the UE may acquire the data information through a PDSCH occasion related to one of the plurality of TRPs.

Here, the PDSCH occasion may be related to one TCI state determined based on the DCI among the plurality of TCI states.

5.2. Single PDCCH Based Signaling and UE Behaviors for PDSCH Repetition

5.2.1. Method on Determination of TB Size from Two CWs

5.2.1.1. First TBS Determination Method

A UE for which the PDSCH-rep-mode is configured may determine the TB size based on at least one of the MCS of a CW having a self-decodable RV (e.g., RV #0, RV #3), resource allocation, or the number of layers.

In this case, when the RVs of two CWs are the same, the UE may determine the TB size based on at least one of the MCS of CW #0 (or CW #1), the number of available REs, or the number of layers.

Alternatively, when the RVs of the two CWs are RV #0 and RV #3, the UE may determine the TB size based on at least one of the MCS of the CW having RV #0 (or RV #3), the number of available REs, or the number of layers.

In this case, a more specific TBS determination method may be based on the above-described TBS determination method. In addition, the UE may calculate the number of available REs based on the resources allocated to the UE. The UE may determine the number of layers based on the number of DMRS ports having an association with the corresponding CW.

In the present disclosure, two CWs may differ from each other in terms of at least one of the MCS, the number of layers, or the number of available REs. In this case, the TB size corresponding may be determined differently according to each CW. However, according to the PDSCH-rep-mode described in the present disclosure, the two CWs are generated based on the same TB, and accordingly it may be unclear the CW forming the basis of determination of the TB size by the UE.

To address this issue, when one of the two CWs has a self-decodable RV value, the UE should be allowed to perform decoding with only the CW. Accordingly, in selecting a CW for determining the TB size, the UE according to the present disclosure may preferentially select a self-decodable RV value. In addition, since RV #0 generally exhibits better performance than RV #3, the UE may select RV #0 in preference to RV #3.

5.2.1.2. Second TBS Determination Method

A UE for which the PDSCH-rep-mode is configured may determine the TB size based on at least one of the MCS of CW #0 (or CW #1), resource allocation, or the number of layers.

According to this exemplary operation, the UE may select a TB related to a specific CW without separate signaling. Accordingly, signaling overhead may be reduced, and overall system complexity may be lowered.

However, when (i) CW #0 and CW #1 correspond to RS set #0 and RS set #1 of the TCI state, respectively, and (ii) the TB size is determined based on CW #0, the UE may determine the TB size based on the beam indicated by RS set #0.

However, according to this method, when the state of the beam indicated by set #1 is better than the state of the beam indicated by RS set #0, loss may occur in terms of throughput because the UE should determine the TB size based on the state of the beam indicated by RS set #0.

5.2.1.3. Third TBS Determination Method

A UE for which the PDSCH-rep-mode is configured may determine each TB size based on at least one of an MCS corresponding to each of the indicated two CWs, resource allocation, and the number of layers. Subsequently, the UE may select a larger one of the calculated TB sizes corresponding to the two CWs as a (representative) TB size.

For example, when the TB size of CW #0 is larger than the TB size of CW #1, the UE may select the TB size of CW #0. This example may be advantageous in terms of throughput as the BS may transmit more information to the UE through one transmission.

5.2.1.4. Fourth TBS Determination Method

A UE for which the PDSCH-rep-mode is configured may determine the TB size corresponding to the CW indicated by DCI and/or higher layer signaling (e.g., RRC or MCA-CE, etc.).

As a specific example, when the NDI for the second TB of the DCI is 0, the UE may select the TB corresponding to CW #0 as a (representative) TB. On the other hand, when the NDI for the second TB of the DCI is 1, the UE may select the TB corresponding to CW #1 as a (representative) TB.

In the example above, the NDI field for the second TB of the DCI may be replaced with an RV field for the second TB of the DCI or a specific field of a higher layer parameter.

5.2.1.5. Fifth TBS Determination Method

A UE for which the PDSCH-rep-mode is configured may determine the TB size based on CW #0 (or TB #1). In addition, the UE may determine/assume a CW-to-RS set mapping relationship based on the NDI, and/or RV, and/or MCS fields of CW #1 (or TB #2). In other words, the BS may indicate/configure the CW-to-RS set mapping relationship to the UE based on the NDI, and/or RV, and/or MCS fields of CW #1 (or TB #2).

In the example above, the remaining bit information in the DCI may be reserved as a specific value. In this case, the reserved specific value may be determined/set based on a configuration value for disabling the CW.

Alternatively, in the example above, the UE may determine the TB size based on CW1 (or TB #2) rather than CW #0.

Alternatively, the remaining bit information in the DCI may not be defined separately. Accordingly, the UE may not expect that the remaining bit information in the DCI is configured. In this case, the BS may save bits in the DCI.

When two CWs are scheduled by a single PDCCH (e.g., Single PDCCH with 2CW), the BS may configure only one frequency domain resource assignment (FRA) to the UE. At this time, when the FRA bit field is divided into two parts to indicate the frequency positions of CW #0 and CW #1, the UE may assume that the most significant bit (MSB) of the FRA and the least significant bit (LSB) of the FRA indicates/allocates the frequency positions of CW #0 and CW #1, respectively.

As a specific example, the UE may determine the TB size based on CW #0. In this case, the LSB (3 bits) and RV (2 bits) fields of the MCS for CW #1 (or TB #2) excluding the NDI field for CW #1 (or TB #2) may be set to 0 (the MSB (2 bits) of the MCS may be used to indicate the modulation order of CW #1). In this case, the 3bits of the LSB and the 2bits of the RV of the MCS are known bits, and accordingly the UE may improve decoding performance of the PDCCH using the same. When the NDI for CW #1 (or TB #2) is equal to 0, the UE may expect that CW #0/#1 are mapped to RS set #0/#1, respectively. On the other hand, when the NDI for CW #1 (or TB #2) is equal to 1, the UE may expect that CW #0/#1 are mapped to RS set #1/#0, respectively.

As another specific example, in determining the LSB and RV bits of the MCS, the UE may consider a disable option of the CW (e.g., even when the TCI state is configured with two RS sets, only specific one RS set is set to be valid, using a CW disable option). For example, MCS=26 (11010) and RV=1 (01) may be set as signaling values for the CW disable option. In consideration of the binary values, '010' and '01' may be set as the default values of the LSB and RV of the MCS. When the demodulation order of CW #1 is indicated/set by LSB 2bits of MCS, the MSB 3bits and RV 2bits of MCS may be determined as/set to '110' and '01', respectively.

As another specific example, in the above-described example, the RV field may indicate the modulation order of CW #1 instead of the MCS field. In this case, all 5 bits of the MCS field may be reserved as '11010'. However, when RV='01' and MCS='11010', CW #1 may be disabled, and therefore a value other than '11010' may be set as a default value of the MCS field. However, in order to indicate disabling of CW #1, the MCS field may have a value of '11010'.

According to the above-described method, since the UE may determine the positions of known bits (e.g., 5 bits) before decoding the signal, it may use the known bits in decoding the signal. In addition, the BS may dynamically switch the CW-to-RS set relationship through NDI. Accordingly, flexibility allowing a TB to be selected according to the beam state may be provided.

However, in order to improve the PDCCH decoding performance of the UE according to the above-described method, the UE should assume that the PDSCH-rep-mode is configured before decoding the PDCCH. If the UE needs to determine whether or not the PDSCH-rep-mode is configured through the TCI state and MCS-C-RNTI check, the UE should perform decoding of the PDCCH based on two hypotheses including the case where the PDSCH-rep-mode is configured and the case where the PDSCH-rep-mode is not configured. Accordingly, in this case, obtaining performance improvement may require cause increase in the complexity of PDCCH decoding of the UE.

5.2.2. Signaling Methods Using MCS of CW which is not Related to Selected TB (or CW #1)

5.2.2.1. First Signaling Method Using MCS

A UE for which the PDSCH-rep-mode is configured may determine the modulation order of a CW not used for TBS determination based on some bits (e.g., MSB, LSB) of the MCS field and/or the RV field for the CW (not used for TBS determination). In this case, the remaining bit information in the MCS field may be fixed to a specific value (e.g., reserve).

When the TB size is determined based on at least one of the MCS, RV, and resource allocation for CW #0 for the UE for which the PDSCH-rep-mode is configured, a code-rate other than the demodulation order may not be needed in the MCS field for CW #1 (TB #2) in the DCI transmitted from the BS to the UE. In other words, in this case, the BS may indicate/configure only the modulation order to the UE using only some bits of the MCS field (e.g., 5 bits) in the DCI.

In Table 27 below, it is assumed that the MCS field has a size of 5 bits, and that a part marked "XXX" may be set to any bits. This is because the part marked "XXX" does not affect the modulation order. As such, based on Table 27 below, the UE may determine the modulation order based only on the MSB of the MCS field of the CW that is not used in TBS determination.

TABLE 27

| MCS field | Modulation Order |
| --- | --- |
| 00XXX | QPSK |
| 01XXX | 16 QAM |
| 10XXX | 64 QAM |
| 11XXX | 256 QAM |

Here, when the part marked "XXX" is fixed to a specific value (e.g., "000"), the UE may perform PDCCH decoding by processing this value as a known bit in PDCCH decoding. As a result, the UE may improve the PDCCH decoding performance.

Alternatively, the part marked "XXX" may not be defined separately. Thereby, the BS may minimize the bit information in the DCI (bit saving). Alternatively, the BS may use the bit information for a purpose different from the conventional one.

5.2.2.2. Second Signaling Method Using MCS

A UE for which the PDSCH-rep-mode is configured may determine the modulation order of CW #1 based on the NDI for TB #2, and/or some bits (e.g., MSB, LSB) of the MCS for TB #2, and/or the RV field for TB #2. In this case, the remaining bits of the MCS field may be fixed to a specific value or reserved.

According to this method, the UE may determine the modulation order of CW #1 based on the DCI field corresponding to TB #2. The BS may fix the remaining bit information (e.g., unused bit information in the MCS field) to a specific value. Accordingly, the UE may operate more simply.

In a specific example, the MCS field corresponding to TB #2 may be redefined as shown in the table below. In this case, the UE may determine the modulation order of CW #1 based on the MSB 2 bits of the MCS field.

TABLE 28

| MCS field of TB#2 | Modulation Order |
| --- | --- |
| 00XXX | QRSK |
| 01XXX | 16 QAM |
| 10XXX | 64 QAM |
| 11XXX | 256 QAM |

Alternatively, the UE may determine the modulation order of CW #1 based on the RV for TB #2 in the DCI based on Table 29 below.

TABLE 29

| RV field of TB #2 | Modulation Order |
| --- | --- |
| 00 | QPSK |
| 01 | 16 QAM |

TABLE 29-continued

| RV field of TB #2 | Modulation Order |
| --- | --- |
| 10 | 64 QAM |
| 11 | 256 QAM |

5.2.3. ACK/NACK Feedback

5.2.3.1. First ACK/NACK Feedback

When two enabled CWs are indicated/configured by a BS to a UE for which the PDSCH-rep-mode is configured, the UE may feed back only a single ACK/NACK to the BS.

As described above, CW #0 and CW #1 may be generated from the same information sequence (or from the same TB). Accordingly, even when two CWs are indicated/configured to the UE, the UE may feed back only a single ACK/NACK. Alternatively, in the case above, the BS may define only one ACK/NACK for the UE.

5.2.3.2. Second ACK/NACK Feedback

The UE receiving the PDSCH through the PDSCH-rep-mode may determine whether to re-receive the PDSCH, based on the HARQ process number and/or the NDI field related to CW #0 (or CW #1).

Specifically, the UE receiving the PDSCH through the PDSCH-rep-mode may receive one TB through the 2CW-based DCI. In this case, the size of the TB may be determined based on CW #0. Accordingly, when retransmission is performed, the BS may not toggle the NDI field related to CW #0, but indicate the same value as before, and informs the UE of the HARQ process number, thereby configuring, to the UE, whether to retransmit a specific PDSCH.

FIG. 14 is a diagram schematically illustrating an exemplary operation of a UE and a BS (e.g., an object including TRP #1 and TRP #2) applicable to the present disclosure.

First, the PDSCH-rep-mode may be configured for the UE by the BS. As described above in section 5.1.1, the configuration may be established through one or more of the following methods.

1) Establishing the configuration through higher layer signaling (e.g., RRC and/or MAC-CE, etc.) of the BS; and
2) (i) DCI including CRC scrambled with RNTI for PDSCH-rep-mode is indicated to the UE, and/or (ii) the BS indicates a TCI state (or two TCI states) having the DCI including two RS sets to the UE, and/or (iii) the PDSCH-rep-mode is configured for the UE by higher layer signaling.

In other words, when the PDSCH-rep-mode is configured based on method 1) between the above-described methods, the UE may additionally receive a PDCCH for scheduling PDSCH #1 and/or PDSCH #2 from TRP #1 or TRP #2.

Alternatively, when the PDSCH-rep-mode is to be configured based on method 2) between the above-described methods, the PDSCH-rep-mode may be configured for the UE based on the determination that (i) the DCI included in a PDCCH for scheduling PDSCH #1 and/or PDSCH #2 received from TRP #1 or TRP #2 includes a CRC scrambled with an RNTI for the PDSCH-rep-mode, and/or (ii) a TCI state (or two TCI states) including two RS sets is indicated.

In addition, based on at least one of the methods according to sections 5.1.2 to 5.1.4 or 5.2.1 to 5.2.3 above, the UE may receive PDSCH #1 (or CW #0 or TB #1) and/or PDSCH #2 (or CW #1 or TB #2) transmitted from TRP #1 and/or TRP #2.

Unlike the example of FIG. 14, the technical configuration according to the present disclosure may be applied even to a configuration in which the UE receives PDSCH #1 and PDSCH #2 from the BS (without distinction between TRPs). In other words, the features may be applied to (i) an operation of the UE of receiving the respective PDSCHs (e.g., PDSCH #1 and PDSCH #2) through different TRPs, or (ii) an operation of the UE of receiving the respective PDSCHs (e.g., PDSCH #1 and PDSCH #2) through the same TRP.

In this case, PDSCH #1 (or CW #0 or TB #1) may be related to a first TCI state among a plurality of TCI states, and PDSCH #2 (or CW #1 or TB #2) may be related to a second TCI state among the plurality of TCI states.

Accordingly, as an example applicable to the present disclosure, RBs allocated to the PDSCH related to the first TCI state in the TCI code point may be used for TBS determination with single MCS indication, while same TBS and modulation order can be assumed for the RBs allocated to PDSCH related to the second TCI state.

As another example, the UE may determine a TB size related to two CWs scheduled by a single PDCCH, based on various methods disclosed in section 5.2.1. In addition, the UE may determine the modulation order for a CW not related to the TB size determination described above, based on the various methods disclosed in section 5.2.2. Accordingly, the UE may receive the two CWs based on the determined TB size and modulation order.

In addition, the UE may receive ACK/NACK feedback related to the two CWs scheduled by a single PDCCH based on various methods disclosed in section 5.2.3 and receive a retransmitted signal based thereon.

As more specific methods, the methods disclosed in sections 5.1.2 to 5.1.4, and 5.2 above may be applied.

Figure 21:
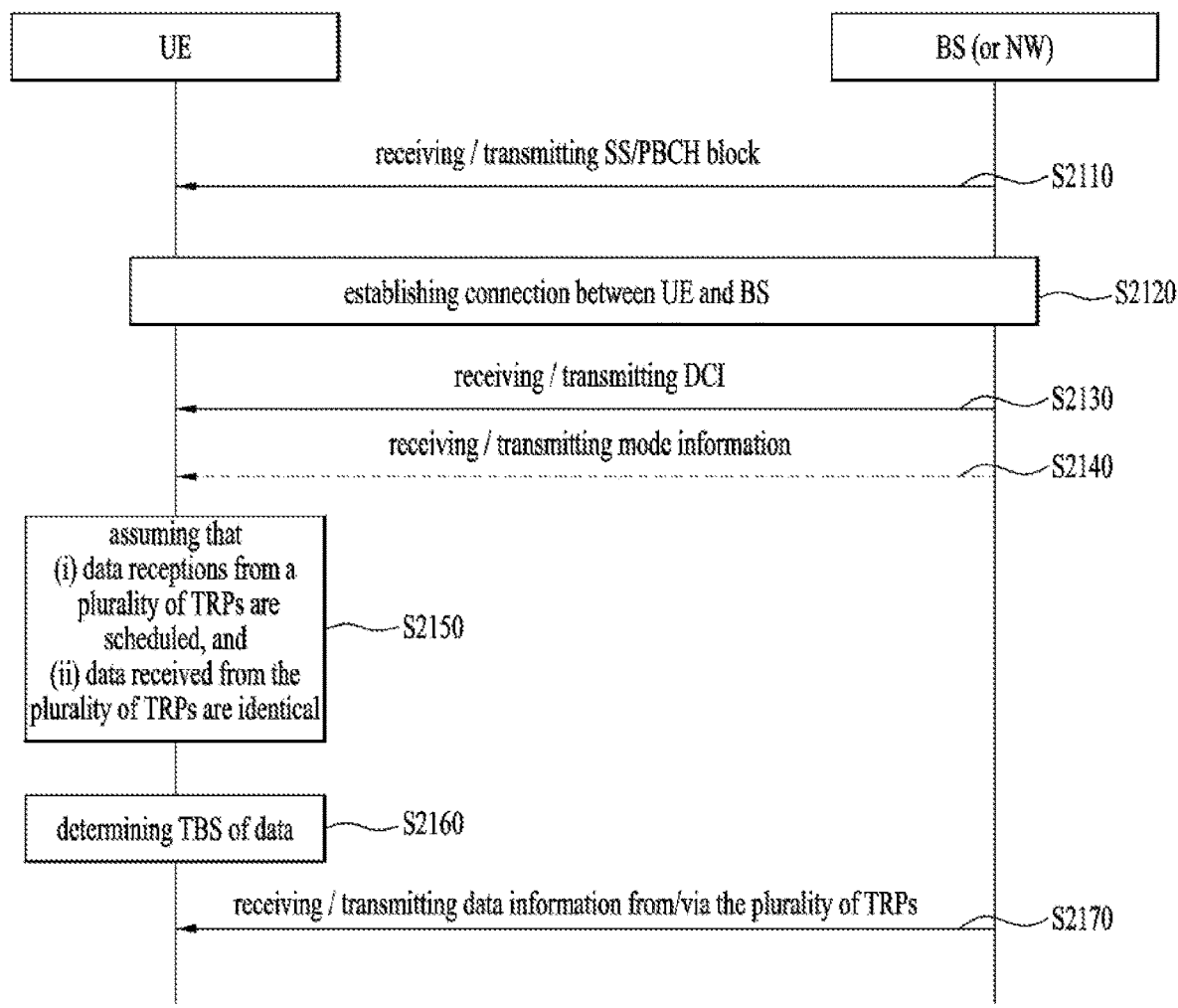
FIG. 21 is a diagram schematically illustrating the operation of a UE and a base station according to an example of the present disclosure.
Figure 22:
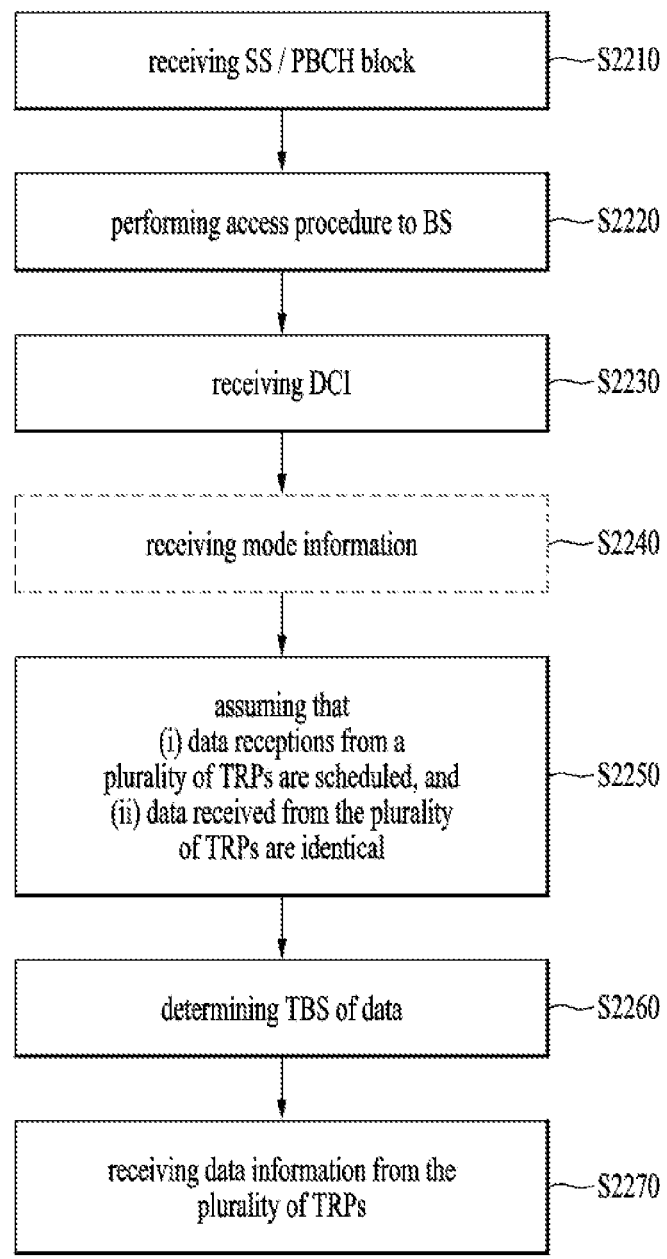
FIG. 22 is a flowchart of an operation of the UE according to an example of the present disclosure.
Figure 23:
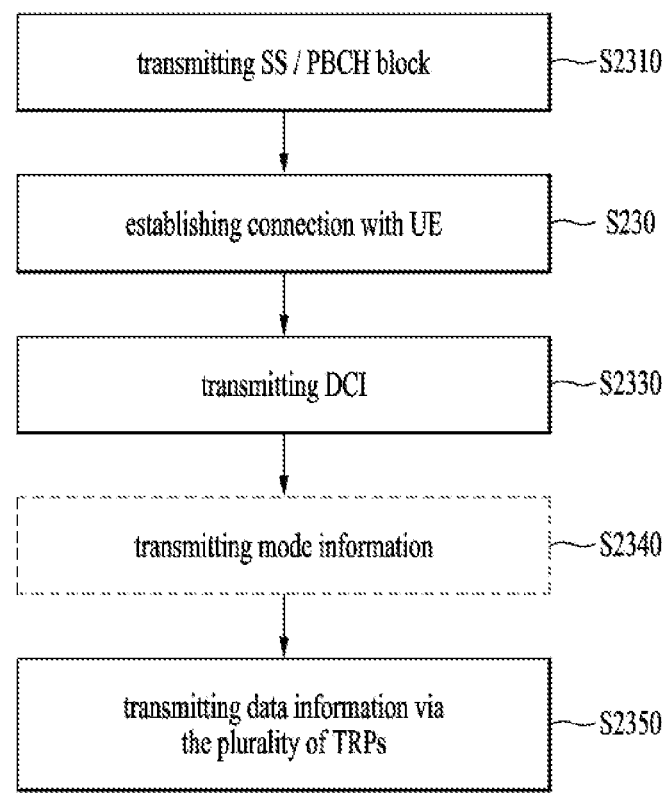
FIG. 23 is a flowchart of an operation of the base station according to an example of the present disclosure.

FIG. 21 is a diagram schematically illustrating the operation of a UE and a base station according to an example of the present disclosure, FIG. 22 is a flowchart of an operation of the UE according to an example of the present disclosure, and FIG. 23 is a flowchart of an operation of the base station according to an example of the present disclosure.

In an example applicable to the present disclosure, the UE may receive a synch signal/physical broadcast channel (SS/PBCH) block including an SS and a PBCH from the BS (S2110 and S2210). In a corresponding operation, the BS may transmit the SS/PBCH block to the UE (S2110 and S2310).

Based on the received SS/PBCH block, the UE may perform a procedure of access to the BS including transmission of a random access channel (RACH) preamble (S2120 and S2220). In response, the BS may establish a connection with the UE (S2120 and S2320).

In addition, the UE and the BS between which the connection is established based on the above-described procedure may operate as follows.

Specifically, the UE may receive, from the BS, DCI including (i) a plurality of TCI states and (ii) information for two TBs (S2130 and S2230). In a corresponding operation, the BS may transmit the DCI to the UE (S2130 and S2230).

In the present disclosure, each of the plurality of TCI states may be related to one RS set.

The UE may acquire, from the BS, mode information related to a first mode in which a plurality of data based on the same information is transmitted.

As an example applicable to the present disclosure, the first mode may include a multi-TRP-based URLLLC (ultra-reliable low latency communication) mode. As another example, the mode information may be related to one of the first mode or a second mode including a multi-TRP-based eMBB (enhanced mobile broadband) mode.

As an example applicable to the present disclosure, the UE may receive the mode information through higher layer signaling including RRC signaling (S2140 and S2240). In a corresponding operation, the BS may transmit the mode information to the UE through higher layer signaling (S2140 and S2340). In this case, the transmission and reception of the mode information may be performed before or after the transmission and reception of the above-described DCI in the time domain.

Alternatively, as another example applicable to the present disclosure, the UE may acquire the information based on DCI including a cyclic redundancy check (CRC) scrambled with a radio network temporary identifier (RNTI) related to the first mode. In other words, the UE may acquire the mode information related to the first mode without additional signaling.

Based on the DCI and the mode information, the UE may assume that (i) data reception is scheduled from a plurality of TRPs by the DCI, and (ii) data received from the plurality of TRPs is based on the same information (S2150 and S2250).

Subsequently, based on the assumption, the UE may determine a transport block size (TBS) related to the data based on information related to one of the two TBs related to the DCI (S2160 and S2260).

As an example applicable to the present disclosure, the information related to the one TB may be information related to a TB related to a codeword having self-decodable redundancy version (RV) information between the two codewords related to the DCI.

Here, the self-decodable RV information may include information related to RV index 0 or RV index 3.

As another example applicable to the present disclosure, the information related to the one TB may be information related to a codeword having a first codeword index between the two codewords related to the DCI.

As another example applicable to the present disclosure, the information related to the one TB may be information related to a PDSCH related to a first TCI state among a plurality of TCI states related to the DCI.

As another example applicable to the present disclosure, the information related to the one TB may be information related to a codeword having a large TBS related to the two codewords related to the DCI.

As another example applicable to the present disclosure, the information related to the one TB may be information related to one codeword indicated by the BS between the two codewords related to the DCI.

Here, the one codeword indicated by the BS may be determined based on new data indicator (NDI) information related to a second TB in the information for the two TBs in the DCI.

In the present disclosure, a modulation order of the one TB may be determined based on the information related to the one TB, and the modulation order of the other one of the two TBs may be determined based on the information related to the other one of the TBs.

Here, the information related to the other TB may include at least one of the followings:
  At least one bit information of NDI information related to the other TB;
  At least one bit information of MCS (modulation and coding scheme) information related to the other TB; and
  RV information related to the other TB Subsequently, the UE may acquire data information from the plurality of TRPs based on the TBS (S2170 and S2270).

In a corresponding operation, the BS may transmit the data information to the UE through a plurality of TRPs based on the DCI and the mode information (S2170 and S2350). In this case, the TBS related to the data information may be related to information related to one of the two TBs related to the DCI.

In the present disclosure, the UE may additionally transmit one acknowledgment information to the BS in response to the data information acquired from the plurality of TRPs.

Examples of the above-described proposed scheme may also be included as one of the implementation methods of the present disclosure, and therefore it is apparent that they may be regarded as a kind of proposed method. In addition, the above-described proposed schemes may be implemented independently, but may be implemented in the form of a combination (or merging) of some of the proposed schemes. As for the information on whether to apply the proposed methods (or information on the rules of the proposed methods), a rule may be defined such that the base station deliver the information to the UE through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to various wireless access systems. Examples of the wireless access systems include a 3rd Generation Partnership Project (3GPP) system or a 3GPP2 system. Besides these wireless access systems, the embodiments of the present disclosure are applicable to all technical fields in which the wireless access systems find their applications. Moreover, the proposed method is also applicable to mmWave communication systems using an ultra-high frequency band.

Additionally, the embodiments of the present disclosure are applicable to various applications such as a self-driving vehicle and a drone.

What is claimed is:
1. A method of receiving downlink control information (DCI) by a User Equipment (UE) in a wireless communication system, the method comprising:
  receiving the DCI for scheduling a physical downlink shared channel (PDSCH) including a first code word (CW) and a second CW;
  receiving, through higher layer signaling, mode information for enabling PDSCH repetitions through a plurality of transmission reception points (TRPs); and receiving the first CW and the second CW based on the DCI based on the PDSCH repetitions, wherein, based on a first transport block size (TBS) for the first CW being different from a second TBS for the second CW, the UE determines one of the first TBS and the second TBS as a single TBS for the PDSCH repetitions, and wherein the single TBS for the PDSCH repetitions is determined based on a first redundancy version (RV) of the first CW and a second RV of the second CW.

2. The method of claim 1, wherein the first TBS is selected as the TBS for the PDSCH repetitions, based on the first RV is a self-decodable RV.

3. The method of claim 2, wherein the self-decodable RV is related to RV index 0 or RV index 3.

4. The method of claim 1, wherein the DCI includes information regarding a plurality of TCI states for the PDSCH repetitions.

5. The method of claim 4, wherein each of the plurality of TCI states is related to one reference signal (RS) set.

6. The method of claim 1, wherein the DCI comprises at least one of:
at least one bit information of new data indicator (NDI) information for at least one CW;
at least one bit information of modulation and coding scheme (MCS) information for at least one CW; or
redundancy version (RV) information for at least one CW.

7. The method of claim 1, further comprising:
transmitting one acknowledgment information for the PDSCH repetitions of the plurality of TRPs.

8. The method of claim 1, wherein the higher layer signaling is radio resource control (RRC) signaling.

9. A User Equipment (UE) in a wireless communication system, the UE comprising:
at least one transceiver;
at least one processor; and
at least one computer memory operably connectable to the at least one processor and storing instructions that, when executed, cause the at least one processor to perform operations comprising:
receiving downlink control information (DCI) for scheduling a physical downlink shared channel (PDSCH) including a first code word (CW) and a second CW;
receiving, through higher layer signaling, mode information for enabling PDSCH repetitions through a plurality of transmission reception points (TRPs); and
receiving the first CW and the second CW based on the DCI based on the PDSCH repetitions,
wherein, based on a first transport block size (TBS) for the first CW being different from a second TBS for the second CW, the UE determines one of the first TBS and the second TBS as a single TBS for the PDSCH repetitions, and
wherein the single TBS for the PDSCH repetitions is determined based on a first redundancy version (RV) of the first CW and a second RV of the second CW.

10. The UE of claim 9, wherein the UE communicates with at least one of a mobile UE, a network, or an autonomous vehicle other than a vehicle including the UE.

* * * * *